United States Patent
Shigeta et al.

(10) Patent No.: US 7,109,980 B2
(45) Date of Patent: Sep. 19, 2006

(54) DISPLAY PANEL DRIVE DEVICE, DISPLAY CONTROL DEVICE, DRIVE DEVICE, DATA TRANSFER SYSTEM, DATA TRANSMISSION DEVICE, AND DATA RECEPTION DEVICE

(75) Inventors: Tetsuya Shigeta, Yamanashi-ken (JP); Tetsuro Nagakubo, Tokyo-to (JP); Kazuhisa Ata, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 452 days.

(21) Appl. No.: 10/602,033

(22) Filed: Jun. 24, 2003

(65) Prior Publication Data

US 2004/0008194 A1 Jan. 15, 2004

(30) Foreign Application Priority Data

| Jun. 26, 2002 | (JP) | ............................. 2002-185710 |
| Jul. 4, 2002 | (JP) | ............................. 2002-196346 |
| Jul. 5, 2002 | (JP) | ............................. 2002-197699 |
| Jul. 25, 2002 | (JP) | ............................. 2002-216174 |

(51) Int. Cl.
G09G 5/00 (2006.01)

(52) U.S. Cl. ...................... 345/204; 345/211; 345/213; 345/60

(58) Field of Classification Search ............ 345/87–89, 345/98–100, 60, 61, 205, 211–213, 204, 76
See application file for complete search history.

(56) References Cited

U.S. PATENT DOCUMENTS 6,147,672 A * 11/2000 Shimamoto .................. 345/589

| 2001/0010512 A1 | 8/2001 | Azami ......................... 345/100 |
| 2001/0038387 A1 | 11/2001 | Tomooka et al. ........... 345/520 |
| 2002/0005863 A1 | 1/2002 | Nagai et al. ................ 345/698 |
| 2002/0140662 A1* | 10/2002 | Igarashi ....................... 345/98 |
| 2003/0016189 A1* | 1/2003 | Abe et al. ..................... 345/55 |

FOREIGN PATENT DOCUMENTS

| EP | 1 349 140 A2 | 10/2003 |
| JP | 11-95713 | 4/1999 |

OTHER PUBLICATIONS

"A Method of System Board Commonality to Support LVDS LCD Panel and Non-LVDS LCD Panel", May 1999, International Business Machines Coporation , Research Disclosure, Kenneth Mason Publications, Hampshire, GB.
"LVDS Owner's Manual, Moving Info with LVDS", (2000), LVDS Owner's Manual, pp. 1-17.

* cited by examiner

Primary Examiner—Xiao Wu
(74) Attorney, Agent, or Firm—Drinker Biddle & Reath LLP

(57) ABSTRACT

A display panel drive device is provided with: a parallel-to-serial converter for conducting parallel-to-serial conversion on an input signal and outputting a serial signal; a transmission section for converting the serial signal output from the parallel-to-serial converter to a signal complying with a differential serial transmission system and transferring a signal via a transmission line; a reception section for receiving the signal transferred via the transmission line; a serial-to-parallel converter for conducting serial-to-parallel conversion on the signal received by the reception section and outputting a parallel signal; and a drive pulse output section for generating a drive pulse to drive a display panel based on the parallel signal output by the serial-to-parallel converter.

44 Claims, 11 Drawing Sheets

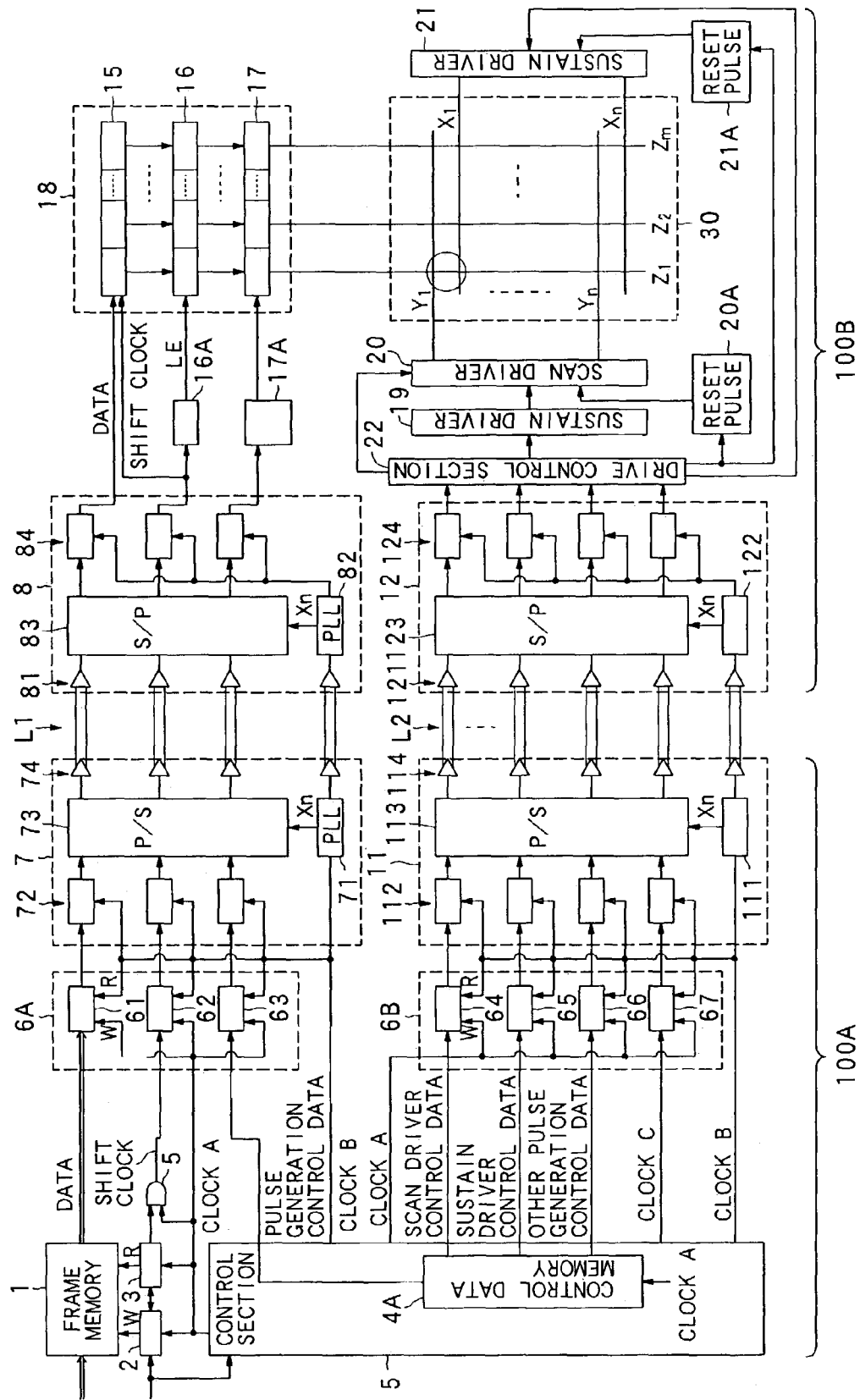

US 7,109,980 B2

DISPLAY PANEL DRIVE DEVICE, DISPLAY CONTROL DEVICE, DRIVE DEVICE, DATA TRANSFER SYSTEM, DATA TRANSMISSION DEVICE, AND DATA RECEPTION DEVICE

BACKGROUND OF THE INVENTION

1. Field of the Invention

The present invention relates to a display panel drive device for driving a display panel of a matrix form, such as a plasma display panel.

2. Description of the Related Art

A display panel drive device for transmitting image data represented as digital data in a display device on a line is described in Japanese Patent Application Laid-Open Publication No. Hei-11-95713. In that device, a system (differential serial transmission system) for transmitting the digital signal using the LVDS (Low Voltage Differential Signaling) is used. The transmission system using the LVDS is a system is a system of driving two signal lines symmetrically with opposite phases and transmitting a difference between signals on the two signal lines. Therefore, the transmission system using the LVDS has a feature that foreign noises cancel each other and hardly affect the signal.

In the device described in Japanese Patent Application Laid-Open Publication No. Hei-11-95713, however, only image data and control signals, such as synchronization signals, are transferred by using the LVDS system, whereas a clock signal used on the reception side is transferred via a different transmission line. When such a configuration is adopted, however, there is a fear that skew (timing deviation) between the image data and the clock signal received on the reception side. For example, it is conceivable to provide a delay circuit in a path of a clock signal to adjust timing in order to eliminate the skew. In this case, however, the adjustment work of timing becomes troublesome.

The device described in Japanese Patent Application Laid-Open Publication No. Hei-11-95713 is a display panel drive device for driving a liquid crystal display. For example, as for a configuration suitable for transmitting a signal group comprising address data and driving pulse generation control data required to drive a display panel such as a plasma display panel by using a differential serial transmission system, any proposal has not been made heretofore. In general, when a skew (timing deviation) between the address data and the drive pulse generation control data occurs, it becomes a cause of false operation. Therefore, it is necessary to exclude such a skew. It is conceivable to provide a delay circuit in a path of a clock signal to adjust timing in order to eliminate the skew. In this case, however, the adjustment work of timing becomes troublesome.

In addition, when the number of transmitted signals increases or the number of transfer destination printed circuit boards becomes plural as the definition of display panels becomes high, then a plurality of sets of LVDS transmitter/receiver become necessary. In such a case, signals received by receivers are transferred via mutually different paths. As a result, a skew (timing deviation) occurs. Therefore, there is a fear that input timing of the drive pulse generation control data to drivers located after the receivers might deviate and a false operation might occur.

When reading image data or the like from a memory and transmitting it by using such a conventional technique, the clock used to read out the image data from the memory and the clock used in the transmission system using LVDS have the same frequency or frequencies mutually related with an integer ratio. In some cases, therefore, both the clock used in operation of reading out image data from the memory and the clock used in transmission using LVDS or used in operation conducted in a transmission destination circuit cannot be set respectively equal to an optimum clock frequency.

SUMMARY OF THE INVENTION

Accordingly, the present invention is made in consideration of the above-mentioned problems. It is an object of the present invention to provide a display panel drive device or the like capable of excluding skews among signals.

Another object of the present invention is to provide a display panel drive device or the like capable of executing data readout operation for controlling the display of the display panel and executing processing operation of data read out based on a clock having a suitable frequency.

Hereafter, reference numerals in accompanying drawings are added in parentheses in order to facilitate understanding the present invention. However, the present invention is not limited to illustrated forms.

The above object of the present invention can be achieved by a display panel drive device (100) provided with: a parallel-to-serial converter (73, 113) for conducting parallel-to-serial conversion on an input signal and outputting a serial signal; a transmission section (74, 114) for converting the serial signal output from the parallel-to-serial converter (73, 113) to a signal complying with a differential serial transmission system and transferring a signal via a transmission line (L1, L2); a reception section (81, 121) for receiving the signal transferred via the transmission line (L1, L2); a serial-to-parallel converter (83) for conducting serial-to-parallel conversion on the signal received by the reception section (81, 121) and outputting a parallel signal; and a drive pulse output section (18, 19, 20, 21, 22, etc.) for generating a drive pulse to drive a display panel (30) based on the parallel signal output by the serial-to-parallel converter (83).

In one aspect of the display panel drive device (100) of the present invention, the input signal comprises drive pulse generation control data and a clock.

According to this display panel drive device (100), the drive pulse generation control data and the clock are subjected to parallel-to-serial conversion and transferred. Therefore, any skew is not generated between the drive pulse generation control data and the clock.

In another aspect of the display panel drive device (100) of the present invention, the display panel drive device (100) is provided with: a display control section (100A) for controlling display on a display panel (30); a drive section (100B) for driving the display panel (30) based on a signal supplied from the display control section (100A); and a data transfer device for transferring data between the display control section (100A) and the drive section (100B), wherein the data transfer device comprises the parallel-to-serial converter (73, 113) and the transmission section (74, 114), and the drive section (100B) comprises the reception section (81, 121) and the serial-to-parallel converter (83, 123).

According to this display panel drive device (100), the drive pulse generation control data and the clock are subjected to parallel-to-serial conversion and transferred. Therefore, any skew is not generated between the drive pulse generation control data and the clock.

In further aspect of the display panel drive device (100) of the present invention, the display panel drive device (100) is provided with: a display control section (100A) for controlling display on a display panel (30); a drive section (100B) for driving the display panel (30) based on a signal supplied from the display control section (100A); and a data transfer device for transferring data between the display control section (100A) and the drive section (100B), wherein the display control section (100A) comprises a storage section (1) for storing address data, a readout section (3) for reading out address data stored in the storage section (1), and a shift clock generation section (5) for generating a shift clock, the drive section (100B) comprises a shift register (15) for successively storing the address data based on the shift clock, a latch circuit (16) for latching the address data stored in the shift register (15), and a drive circuit (17) for driving the display panel (30) based on the address data output from the latch circuit (16), the input signal comprises the address data and the shift clock, the data transfer device comprises the parallel-to-serial converter (73, 113) and the transmission section (74), and the drive section (100B) comprises the reception section (81, 121) and the serial-to-parallel converter (83).

According to this display panel drive device (100), the address data and the shift clock are subjected to parallel-to-serial conversion and transferred. Therefore, any skew is not generated between the address data and the shift clock. Therefore, there is no timing deviation in storage of address data into the shift register and latch of the stored address data, and there is no fear of occurrence of a false operation.

In further aspect of the display panel drive device (100) of the present invention, the input signal comprises the address data and drive pulse generation control data.

According to this display panel drive device (100), the address data and the drive pulse generation control data are subjected to parallel-to-serial conversion and transferred. Therefore, any skew is not generated between the address data and the drive pulse generation control data.

In further aspect of the display panel drive device (100) of the present invention, the display panel drive device (100) is provided with: a display control section (100A) for controlling display on a display panel (30); a drive section (100B) for driving the display panel (30) based on a signal supplied from the display control section (100A); and a data transfer device for transferring data between the display control section (100A) and the drive section (100B), wherein the data transfer device comprises the parallel-to-serial converter (73) and the transmission section (74), and the drive section (100B) comprises the reception section (81) and the serial-to-parallel converter (83).

According to this display panel drive device (100), the address data and the drive pulse generation control data are subjected to parallel-to-serial conversion and transferred. Therefore, any skew is not generated between the address data and the drive pulse generation control data.

In further aspect of the display panel drive device (100) of the present invention, the display control section (100A) comprises a storage section (1) for storing address data, a readout section (3) for reading out address data stored in the storage section (1), and a control data generation section (5) for generating drive pulse generation control data, the drive section (100B) comprises a shift register (15) for successively storing the address data, a latch circuit (16) for latching the address data stored in the shift register (15), a drive circuit (17) for driving the display panel (30) based on the address data output from the latch circuit (16), and a power supply circuit (17A) for applying a power supply voltage to the drive circuit (17) based on the drive pulse generation control data.

According to this display panel drive device (100), the address data and the drive pulse generation control data are subjected to parallel-to-serial conversion and transferred. Therefore, any skew is not generated between the address data and the drive pulse generation control data. Therefore, there is no fear of occurrence of a false operation, when the display panel (30) is driven by the drive circuit (17).

The above object of the present invention can be achieved by a display panel drive device (100) provided with a display control section (100A) for controlling display on a display panel (30), a drive section for driving the display panel (30) based on a signal supplied from the display control section (100A), and a data transfer device for transferring data between the display control section (100A) and the drive section (100B), wherein the data transfer device comprises a plurality of transmitters (Ta1, Ta2, . . . Tam) in the display control section (100A), and comprises a plurality of receivers (Ra1, Ra2, . . . Ram) respectively combined with the transmitters (Ta1, Ta2, . . . Tam) and included in the drive section (100B), each of the transmitters (Ta1, Ta2, . . . Tam) comprises a first PLL circuit (41) for generating a first clock equivalent in frequency to n times an input clock and a second clock equivalent in frequency to the input clock in synchronism with the input clock, a parallel-to-serial converter (42) for conducting parallel-to-serial conversion on drive pulse generation control data based on the first clock output from the first PLL circuit (41), and a transmission section (43) for converting a serial signal output from the parallel-to-serial converter (42) to a signal complying with a differential serial transmission system and transferring the signal toward the drive section (100B) via a transmission line (L), and each of the receivers (Ra1, Ra2, . . . Ram) comprises a reception section (51) for receiving the drive pulse generation control data transferred from corresponding one of the transmitters (Ta1, Ta2, . . . Tam) via the transmission line (L), a second PLL circuit (52) for generating a third clock equivalent in frequency to n times the first clock output and transmitted from the first PLL circuit (41) and a fourth clock equivalent in frequency to the first clock in synchronism with the first clock, and a serial-to-parallel converter (53) for conducting serial-to-parallel conversion on the received drive pulse generation control data based on the third clock output from the second PLL circuit (52).

In one aspect of the display panel drive device (100) of the present invention, the display panel drive device (100) is further provided with a clock transmission device (L1, L2) for transmitting the input clock as a common clock for the receivers (Ra1, Ra2, . . . Ram), and a first latch circuit (Ld1, Ld2, . . . Ldm, Lf1, Lf2, . . . Lfn) for latching signals output from the receivers (Ra1, Ra2, . . . Ram) based on the common clock transmitted by the clock transmission device (L1, L2).

In one aspect of the display panel drive device (100) of the present invention, the display panel drive device (100) is further provided with a gate signal transmission device (L3, L4) for transmitting a gate signal latched based on the input clock toward the drive section (100B), and a gate circuit (8, 9) for gating a signal output from the receivers (Ra1, Ra2, . . . Ram) based on the gate signal transmitted by the gate signal transmission device (L3, L4).

The above object of the present invention can be achieved by a display panel drive device (100) provided with a memory (1) for storing display control data, a readout device (3) for reading out the display control data from the memory (1) based on a first clock having a first frequency, a data transfer device (7, 11) for transferring the display control data read out by the readout device (3), and a display panel drive section (100B) for driving a display panel (30) based on the display control data transferred by the data transfer device (7, 11), wherein a clock conversion circuit (6A, 6B) is provided between the memory (1) and the data transfer device (7, 11).

The above object of the present invention can be achieved by a display control device having a display control section (100A) of a display panel drive device (100) provided with a display control section (100A) for controlling display on a display panel (30), a drive section (100B) for driving the display panel (30) based on a signal supplied from the display control section (100A), and a data transfer device for transferring data between the display control section (100A) and the drive section (100B), wherein the data transfer device comprises in the display control section (100A): a parallel-to-serial converter (73, 113) for conducting parallel-to-serial conversion on an input signal and outputting a serial signal; and a transmission section (74, 114) for converting the serial signal output from the parallel-to-serial converter (73, 113) to a signal complying with a differential serial transmission system and transferring a signal toward the drive section via a transmission line (L1, L2), and the data transfer device comprises in the drive section (100B): a reception section (81, 121) for receiving the signal transferred via the transmission line (L1, L2); and a serial-to-parallel converter (83) for conducting serial-to-parallel conversion on the signal received by the reception section (81, 121).

The above object of the present invention can be achieved by a display control device having a display control section (100A) of a display panel drive device (100) provided with a display control section (100A) for controlling display on a display panel (30), a drive section (100B) for driving the display panel (30) based on a signal supplied from the display control section (100A), and a data transfer device for transferring data between the display control section (100A) and the drive section (100B), wherein the data transfer device comprises a plurality of transmitters (Ta1, Ta2, . . . Tam) in the display control section (100A), and comprises a plurality of receivers (Ra1, Ra2, . . . Ram) respectively combined with the transmitters (Ta1, Ta2, . . . Tam) and included in the drive section (100B), each of the transmitters (Ta1, Ta2, . . . Tam) comprises a first PLL circuit (41) for generating a first clock equivalent in frequency to n times an input clock and a second clock equivalent in frequency to the input clock in synchronism with the input clock, a parallel-to-serial converter (42) for conducting parallel-to-serial conversion on drive pulse generation control data based on the first clock output from the first PLL circuit (41), and a transmission section (43) for converting a serial signal output from the parallel-to-serial converter (42) to a signal complying with a differential serial transmission system and transferring the signal toward the drive section (100B) via a transmission line (L), and each of the receivers (Ra1, Ra2, . . . Ram) comprises a reception section (51) for receiving the drive pulse generation control data transferred from corresponding one of the transmitters (Ta1, Ta2, . . . Tam) via the transmission line (L), a second PLL circuit (52) for generating a third clock equivalent in frequency to n times the first clock output and transmitted from the first PLL circuit (41) and a fourth clock equivalent in frequency to the first clock in synchronism with the first clock, and a serial-to-parallel converter (53) for conducting serial-to-parallel conversion on the received drive pulse generation control data based on the third clock output from the second PLL circuit (52).

The above object of the present invention can be achieved by a drive device having a drive section (100B) of a display panel drive device (100) provided with a display control section (100A) for controlling display on a display panel (30), a drive section (100B) for driving the display panel (30) based on a signal supplied from the display control section (100A), and a data transfer device for transferring data between the display control section (100A) and the drive section (100B), wherein the data transfer device comprises in the display control section (100A): a parallel-to-serial converter (73, 113) for conducting parallel-to-serial conversion on an input signal and outputting a serial signal; and a transmission section (74, 114) for converting the serial signal output from the parallel-to-serial converter (73, 113) to a signal complying with a differential serial transmission system and transferring a signal toward the drive section via a transmission line (L1, L2), and the drive section (100B) comprises: a reception section (81, 121) for receiving the signal transferred via the transmission line (L1, L2); and a serial-to-parallel converter (83) for conducting serial-to-parallel conversion on the signal received by the reception section (81, 121).

The above object of the present invention can be achieved by a drive device having a drive section (100B) of a display panel drive device (100) provided with a display control section (100A) for controlling display on a display panel (30), a drive section (100B) for driving the display panel (30) based on a signal supplied from the display control section (100A), and a data transfer device for transferring data between the display control section (100A) and the drive section (100B), wherein the data transfer device comprises a plurality of transmitters (Ta1, Ta2, . . . Tam) in the display control section (100A), and comprises a plurality of receivers (Ra1, Ra2, . . . Ram) respectively combined with the transmitters (Ta1, Ta2, . . . Tam) and included in the drive section (100B), each of the transmitters (Ta1, Ta2, . . . Tam) comprises a first PLL circuit (41) for generating a first clock equivalent in frequency to n times an input clock and a second clock equivalent in frequency to the input clock in synchronism with the input clock, a parallel-to-serial converter (42) for conducting parallel-to-serial conversion on drive pulse generation control data based on the first clock output from the first PLL circuit (41), and a transmission section (43) for converting a serial signal output from the parallel-to-serial converter (42) to a signal complying with a differential serial transmission system and transferring the signal toward the drive section (100B) via a transmission line (L), and each of the receivers (Ra1, Ra2, . . . Ram) comprises a reception section (51) for receiving the drive pulse generation control data transferred from corresponding one of the transmitters (Ta1, Ta2, . . . Tam) via the transmission line (L), a second PLL circuit (52) for generating a third clock equivalent in frequency to n times the first clock output and transmitted from the first PLL circuit (41) and a fourth clock equivalent in frequency to the first clock in synchronism with the first clock, and a serial-to-parallel converter (53) for conducting serial-to-parallel conversion on the received drive pulse generation control data based on the third clock output from the second PLL circuit (52).

The above object of the present invention can be achieved by a data transfer system for conducting data transfer between a first device (100A) and a second device (100B), provided with: the first device (100A) comprises a plurality of transmitters (Ta1, Ta2, . . . Tam), and the second device (100B) comprises a plurality of receivers (Ra1, Ra2, . . . Ram) respectively combined with the transmitters (Ta1, Ta2, . . . Tam), each of the transmitters (Ta1, Ta2, . . . Tam)

comprises a first PLL circuit (41) for generating a first clock equivalent in frequency to n times an input clock and a second clock equivalent in frequency to the input clock in synchronism with the input clock, a parallel-to-serial converter (42) for conducting parallel-to-serial conversion on data based on the first clock output from the first PLL circuit (41), and a transmission section (43) for converting a serial signal output from the parallel-to-serial converter (42) to a signal complying with a differential serial transmission system and transferring the signal toward the second device (100B) via a transmission line (L), and each of the receivers (Ra1, Ra2, . . . Ram) comprises a reception section (51) for receiving the data transferred from corresponding one of the transmitters (Ta1, Ta2, . . . Tam) via the transmission line (L), a second PLL circuit (52) for generating a third clock equivalent in frequency to n times the first clock output and transmitted from the first PLL circuit (41) and a fourth clock equivalent in frequency to the first clock in synchronism with the first clock, and a serial-to-parallel converter (53) for conducting serial-to-parallel conversion on the received data based on the third clock output from the second PLL circuit (52).

In one aspect of the data transfer system of the present invention, the data transfer system is provided with a clock transmission device (L1, L2) for transmitting the input clock as a common clock for the receivers (Ra1, Ra2, . . . Ram), and a first latch circuit (Ld1, Ld2, . . . Ldm, Lf1, Lf2, . . . Lfn) for latching signals output from the receivers (Ra1, Ra2, . . . Ram) based on the common clock transmitted by the clock transmission device (L1, L2).

In another aspect of the data transfer system of the present invention, the data transfer system is further provided with a gate signal transmission device (L3, L4) for transmitting a gate signal latched based on the input clock toward the second device (100B), and a gate circuit (8, 9) for gating a signal output from the receivers (Ra1, Ra2, . . . Ram) based on the gate signal transmitted by the gate signal transmission device (L3, L4).

The above object of the present invention can be achieved by a data transmission device having a first device (100A) provided with: a data transfer system for conducting data transfer between a first device (100A) and a second device (100B), wherein the first device (100A) comprises a plurality of transmitters (Ta1, Ta2, . . . Tam), and the second device (100B) comprises a plurality of receivers (Ra1, Ra2, . . . Ram) respectively combined with the transmitters (Ta1, Ta2, . . . Tam), each of the transmitters (Ta1, Ta2, . . . Tam) comprises a first PLL circuit (41) for generating a first clock equivalent in frequency to n times an input clock and a second clock equivalent in frequency to the input clock in synchronism with the input clock, a parallel-to-serial converter (42) for conducting parallel-to-serial conversion on data based on the first clock output from the first PLL circuit (41), and a transmission section (43) for converting a serial signal output from the parallel-to-serial converter (42) to a signal complying with a differential serial transmission system and transferring the signal toward the second device (100B) via a transmission line (L), and each of the receivers (Ra1, Ra2, . . . Ram) comprises a reception section (51) for receiving the data transferred from corresponding one of the transmitters (Ta1, Ta2, . . . Tam) via the transmission line (L), a second PLL circuit (52) for generating a third clock equivalent in frequency to n times the first clock output and transmitted from the first PLL circuit (41) and a fourth clock equivalent in frequency to the first clock in synchronism with the first clock, and a serial-to-parallel converter (53) for conducting serial-to-parallel conversion on the received data based on the third clock output from the second PLL circuit (52).

The above object of the present invention can be achieved by a data reception device having a second device (100B) provided with: a data transfer system for conducting data transfer between a first device (100A) and a second device (100B), wherein the first device (100A) comprises a plurality of transmitters (Ta1, Ta2, . . . Tam), and the second device (100B) comprises a plurality of receivers (Ra1, Ra2, . . . Ram) respectively combined with the transmitters (Ta1, Ta2, . . . Tam), each of the transmitters (Ta1, Ta2, . . . Tam) comprises a first PLL circuit (41) for generating a first clock equivalent in frequency to n times an input clock and a second clock equivalent in frequency to the input clock in synchronism with the input clock, a parallel-to-serial converter (42) for conducting parallel-to-serial conversion on data based on the first clock output from the first PLL circuit (41), and a transmission section (43) for converting a serial signal output from the parallel-to-serial converter (42) to a signal complying with a differential serial transmission system and transferring the signal toward the second device (100B) via a transmission line (L), and each of the receivers (Ra1, Ra2, . . . Ram) comprises a reception section (51) for receiving the data transferred from corresponding one of the transmitters (Ta1, Ta2, . . . Tam) via the transmission line (L), a second PLL circuit (52) for generating a third clock equivalent in frequency to n times the first clock output and transmitted from the first PLL circuit (41) and a fourth clock equivalent in frequency to the first clock in synchronism with the first clock, and a serial-to-parallel converter (53) for conducting serial-to-parallel conversion on the received data based on the third clock output from the second PLL circuit (52).

BRIEF DESCRIPTION OF THE DRAWINGS

FIG. 12 is a block diagram showing a display panel drive device of the third embodiment.

DESCRIPTION OF THE PREFERRED EMBODIMENTS

First Embodiment

Figure 1:
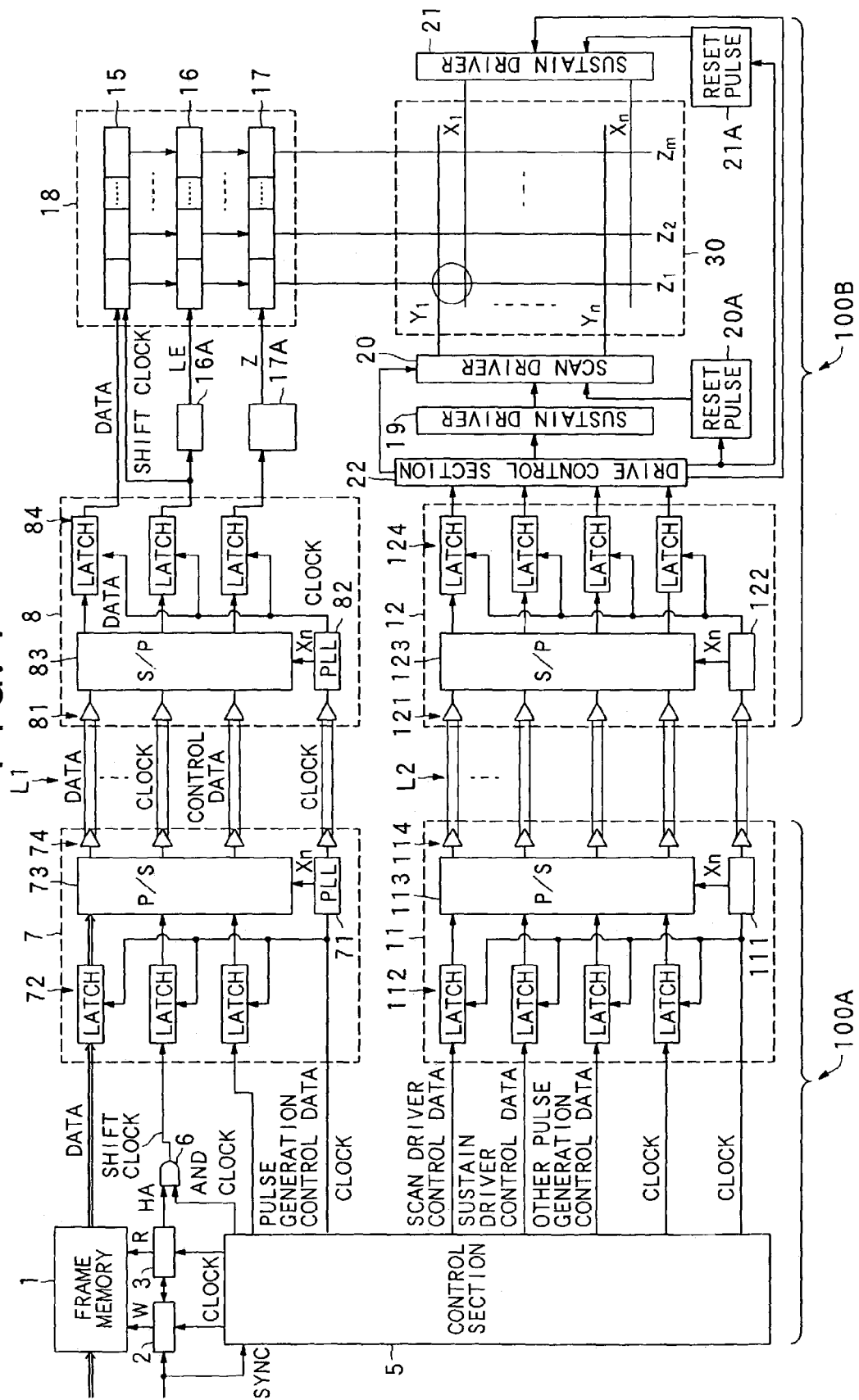
FIG. 1 is a block diagram showing a display panel drive device of the first embodiment.

Hereafter, an embodiment of a display panel drive device according to the present invention will be described with reference to FIGS. 1 to 9. FIG. 1 is a block diagram showing a display panel drive device of the present embodiment.

As shown in FIG. 1, a display panel drive device 100 of the present embodiment is formed by mutually connecting a display control section 100A and a drive section 100B by using transmission lines L1 and L2.

As shown in FIG. 1, the display control section 100A includes a frame memory 1 for successively storing address data, a write control section 2 for writing address data into the frame memory 1, a read control section 3 for reading address data from the frame memory 1, a control section 5 for controlling various sections of the device, an AND circuit 6 for performing an AND operation on a clock A output from the control section 5 and a signal HA output from the read control section 3, a serializer 7 for converting multi-bit parallel data, such as address data, read out from the frame memory 1 to a serial differential signal, and a serializer 11 for converting multi-bit parallel data, such as control data, output from the control section 5 to a serial differential signal.

The drive section 100B includes a de-serializer 8 for converting a serial differential signal transferred from the serializer 7 via the transmission line L1 to multi-bit parallel data, a de-serializer 12 for converting a serial differential signal transferred from the serializer 11 via the transmission line L2 to multi-bit parallel data, an address driver section 18 comprising a shift register 15 for storing address data corresponding to one line, a latch circuit 16 for latching address data corresponding to one line when address data corresponding to one line has been stored in the shift register 15, and an address driver 17 for generating data pulses corresponding to one line according to address data corresponding to one line and applying the data pulses simultaneously to column electrodes Z1 to Zm of a plasma display panel 30, a sustain driver 19 for applying a Y sustain pulse simultaneously to sustain electrodes Y1 to Yn of the plasma display panel 30, a scan driver 20 for applying a scan pulse successively to sustain electrodes Y1 to Yn, a sustain driver 21 for applying an X sustain pulse simultaneously to sustain electrodes X1 to Xn of the plasma display panel 30, and a drive control section 22 for controlling reset pulse generation circuits 20A and 21A, for generating a reset pulse, the sustain driver 19, the scan driver 20 and the sustain driver 21.

As shown in FIG. 1, the serializer 7 includes a PLL section 71 for receiving the clock from the control section 5 and generating a transmission clock, an input latch section 72 for latching address data read out from the frame memory 1, a shift clock output from the AND circuit 6, and pulse generation control data output from the control section 5 respectively based on the clock supplied from the control section 5, a parallel-to-serial conversion section 73 for serializing parallel data latched by the input latch section 72 based on a clock that is supplied from the PLL section 71 and that is n times in frequency the clock supplied from the control section 5, and a transmission output section 74 for conducting differential serial transmission of serial data output from the parallel-to-serial conversion section 73, via the transmission line L1 formed of a twist cable or the like.

The de-serializer 8 includes a reception section 81 for receiving the differential serial signal transferred via the transmission line L1, a PLL section 82 for receiving a transfer clock transferred via the transmission line L1 and generating a clock, a serial-to-parallel conversion section 83 for converting a serial signal output from the reception section 81 to parallel data based on a clock that is supplied from the PLL section 82 and that is n times in frequency the transfer clock, and an output latch section 84 for latching the parallel data output from the serial-to-parallel conversion section 83 based on the clock supplied from the PLL section 82. The transfer clock and the clock supplied to the output latch section 84 have the same frequency as that of the clock input to the PLL section 71.

Thus, in the display panel drive device 100 of the present embodiment, both the address data and the shift clock are converted to a series of serial data by the serializer 7, and transferred in a lump. Therefore, there is no fear that a skew (timing deviation) may occur between the address data and the shift clock. As described later, the shift clock is used as a timing clock for latching the address data in the address driver section 18 on the reception side (the drive section 100B side). Since a skew is not generated between the address data and the shift clock, however, there is no fear of occurrence of false operation. In addition, means for timing alignment, such as a delay circuit for canceling the skew, are not needed.

Thus, in the display panel drive device 100 of the present embodiment, both the address data and the pulse generation control data are converted to a series of serial data by the serializer 7, and transferred in a lump. Therefore, there is no fear that a skew (timing deviation) may occur between the address data and the pulse generation control data. As described later, the pulse generation control data is used as data that generates a power supply voltage pulse for generating a drive pulse in the address driver section 18 on the reception side (the drive section 100B side) at predetermined timing. Since a skew is not generated between the address data and the pulse generation control data, however, a correct drive pulse according to the address data can be certainly generated at correct timing. In addition, means for timing alignment, such as a delay circuit for canceling the skew, are not needed. Operation of the address driver section 18 will be further described later.

As shown in FIG. 1, the serializer 11 includes a PLL section 111 for receiving a clock from the control section 5 and generating a transmission clock, an input latch section 112 for latching scan driver control data, sustain driver control data, other pulse generation control data, and a clock, which are output from the control section 5, based on a clock output from the control section 5, a parallel-to-serial conversion section 113 for serializing parallel data latched by the input latch section 112 based on a clock that is n times in frequency of the clock supplied from the control section 5, and a transmission output section 114 for conducting differential serial transmission of serial data output from the parallel-to-serial conversion section 113, via the transmission line L2 formed of a twist cable or the like.

The de-serializer 12 includes a reception section 121 for receiving the differential serial signal transferred via the transmission line L2, a PLL section 122 for receiving a transfer clock transferred via the transmission line L2 and generating a clock, a serial-to-parallel conversion section 123 for converting a serial signal output from the reception section 121 to parallel data based on a clock that is supplied from the PLL section 122 and that is n times in frequency the transfer clock, and an output latch section 124 for latching the parallel data output from the serial-to-parallel conversion section 123 based on the clock supplied from the PLL section 122. The transfer clock and the clock supplied to the output latch section 124 have the same frequency as that of the clock input to the PLL section 111.

As shown in FIG. 1, the clock output from the de-serializer 12 is supplied to the drive control section 22. The drive control section 22 controls generation timing of a drive pulse based on this clock.

Thus, in the display panel drive device 100 of the present embodiment, control data, such as scan driver control data, sustain driver control data, and other pulse generation control data, and the clock are converted to a series of serial data by the serializer 11, and transferred in a lump. Therefore, there is no fear that a skew (timing deviation) may occur between these control data and the clock. As described later, the transferred clock is used as a timing clock when generating a drive pulse in the drive control section 22 based on the control data on the reception side (the drive section 100B side). Since a skew is not generated between these control data and the clock, however, there is no fear of occurrence of false operation. In addition, means for timing alignment, such as a delay circuit for canceling the skew, are not needed.

Operation of the panel drive device 100 will now be described.

Figure 2:
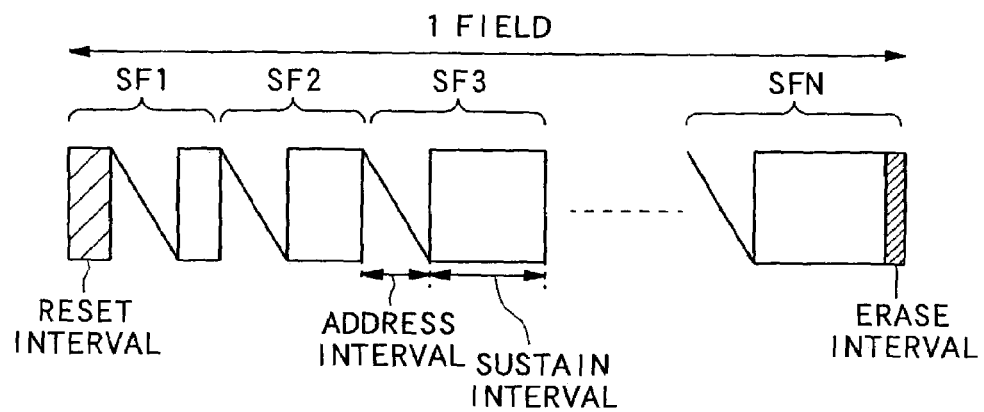
FIG. 2 is a diagram showing a configuration of one field.

One field serving as an interval for driving the plasma display panel 30 is formed of a plurality of subfields SF1 to SFN. As shown in FIG. 2, an address interval for selecting a cell to be lit and a sustain interval for causing the cell selected in the address interval to continue to be lit for a predetermined time are provided in each subfield. A reset interval for resetting the lit state in a preceding field is further provided in a head portion of SF1, which is a first subfield. In this reset interval, all cells are reset to lit cells (cells having wall charge formed therein) or reset to put-out cells (cells having no wall charge formed therein). In the former case, predetermined cells are switched to put-out cells. In the latter case, predetermined cells are switched to lit cells in a subsequent address interval. The sustain interval is made longer step by step in the order of SF1, SF2, SFN. Predetermined gradation display is made possible by changing the number of subfields that continue to be lit.

Figure 3:
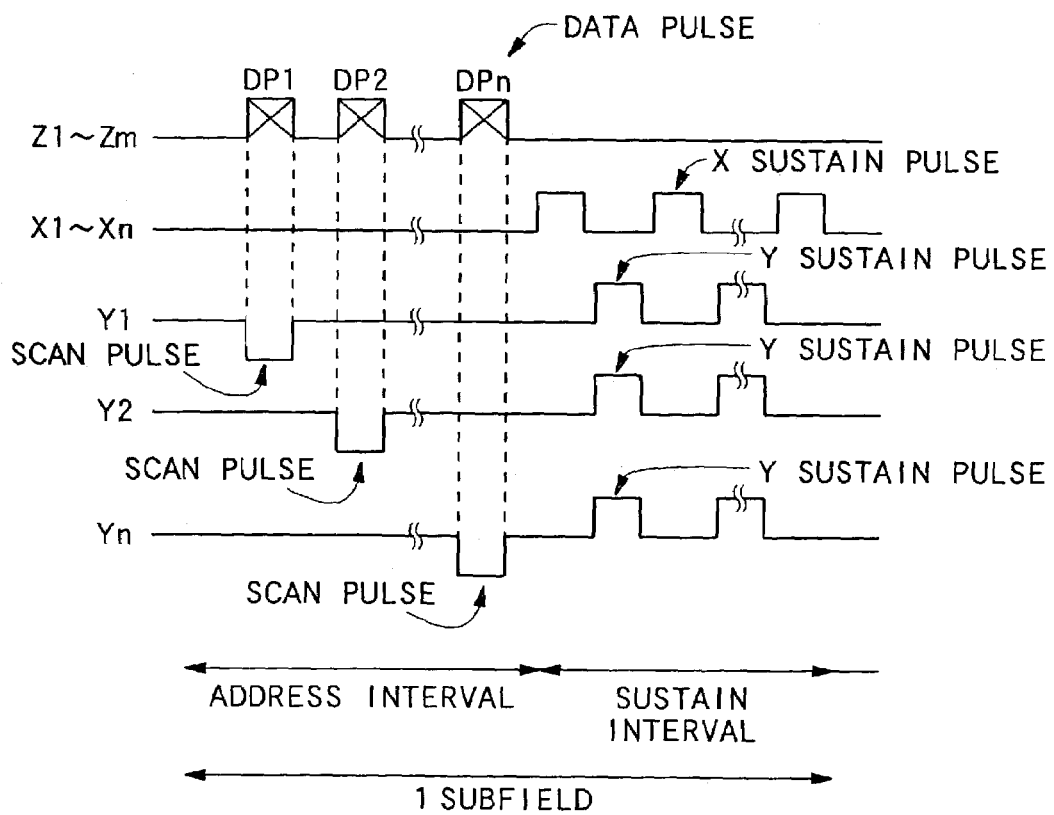
FIG. 3 is a diagram showing a drive pulse in one subfield.

In the address interval of each subfield shown in FIG. 3, address scan is conducted from line to line. In other words, at the same time that a scan pulse is applied to a row electrode Y1 forming a first line, a data pulse DP1 depending on address data that corresponds to a cell on a first line is applied to column electrodes Z1 to Zm. Subsequently, at the same time that a scan pulse is applied to a row electrode Y2 forming a second line, a data pulse DP2 depending on address data that corresponds to a cell on a second line is applied to column electrodes Z1 to Zm. A scan pulse and a data pulse are simultaneously applied to a cell on each of a third line and subsequent lines as well in the same way. Finally, at the same time that a scan pulse is applied to a row electrode Yn forming an nth line, a data pulse DPn depending on address data that corresponds to a cell on an nth line is applied to column electrodes Z1 to Zm. In the address interval, predetermined cells are switched from lit cells to put-out cells, or from put-out cells to lit cells.

When the address scan is thus finished, then every cell in the subfield is set to either a lit cell or a put-out cell. In the subsequent sustain interval, only the lit cells repeat light emission every time a sustain pulse is applied. In the sustain interval, an X sustain pulse and a Y sustain pulse are repetitively applied respectively to the row electrodes X1 to Xn and the row electrodes Y1 to Yn at predetermined timing as shown in FIG. 3. In the final subfield SFN, an erase interval for setting all cells to put-out cells is provided.

Signal processing of various control data and the clock used to drive the plasma display panel 30 will now be described.

As shown in FIG. 1, the address data read out from the frame memory 1, the shift clock output from the AND circuit 6, and the pulse generation control data output from the control section 5 are converted to a serial form by the parallel-to-serial conversion section 73 based on the clock supplied from the control section 5, and converted to a signal complying with the differential serial transmission system (LVDS transmission system) by the transmission output section 74. The differential serial signal (LVDS signal) thus obtained is subject to fast LVDS data transfer via the transmission line L1. Here, the address data is bit data (serial data) of each subfield for each of R, G and B cells. Serial data respectively of R, G and B are input to the serializer 7 in parallel together with the shift clock and the pulse generation control data. These parallel data are converted to a serial signal by the serializer 7.

The serial signal transferred via the transmission line L1 is converted to a parallel form. The original parallel signal is thus restored.

Figure 4:
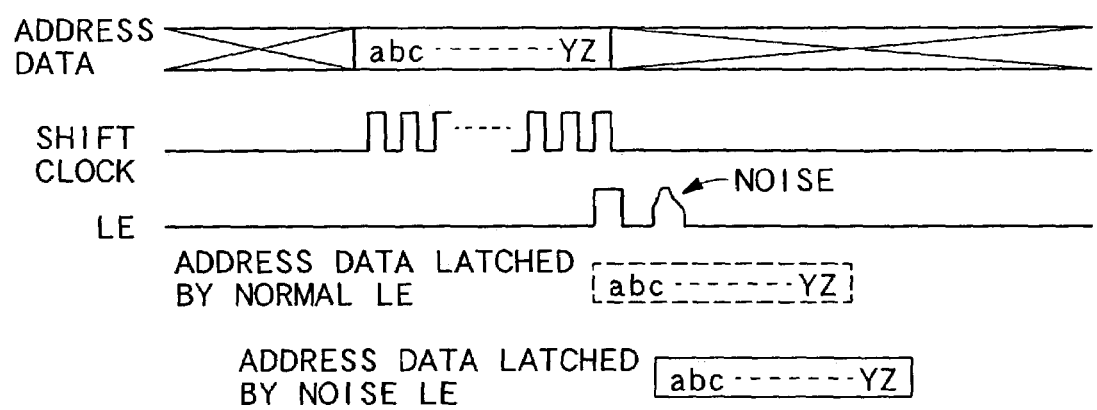
FIG. 4 is a diagram showing address data latched by latch enable.

FIG. 4 is a diagram showing timing of the address data writing and latch enable. The address data output from the de-serializer 8 are successively written into the shift register 15 from line to line. As shown in FIG. 4, simultaneously with a rising edge of a shift clock for writing the final data (data z) corresponding to one line, a latch enable input to the latch circuit 16 rises. Therefore data corresponding to one line (for example, data "a" to data "z") are latched and simultaneously input to the address driver 17. As a result, at the same time that a scan pulse is applied successively to the row electrodes Y1 to Yn during the address period, data pulses DP1 to DPn according to predetermined address date are applied to column electrodes Z1 to Zm. The latch enable is generated in a latch enable generation section 16A based on the shift clock.

In the present embodiment, a signal HA is output from the read control section 3 only while the address data is being read out from the frame memory 1. Since the signal HA and the clock output from the control section 5 are input to the AND circuit 6, the clock is passed only during an interval in which the signal HA is output (the signal HA is "H") and is output as the shift clock, as shown in FIG. 1. In other words, during an interval in which the address data is not read out from the frame memory 1, supply of the shift clock is stopped. Since the shift clock is not supplied during the interval in which the address data is not read out as shown in FIG. 4, therefore, the data of the shift register 15 is not updated, and a storage state obtained when the signal of the latch enable has risen is maintained in the shift register 15. Even when noise is superposed on the latch enable, therefore, data latched by the noise becomes the same as the normal address data as shown in FIG. 4. Even when address data is latched by noise at false timing, therefore, data pulses according to normal address data are applied to the plasma display panel 30.

The pulse generation control data output from the de-serializer 8 is data for controlling on/off of a switch provided in an address resonance power supply circuit 17A (FIG. 1), which outputs a drive pulse toward the address driver 17. A concrete example of the address resonance power supply circuit 17A will be described later.

On the other hand, the scan driver control data, the sustain driver control data, other pulse generation control data, and the clock, which are output from the control section 5, are converted to a serial form by the parallel-to-serial conversion section 113 based on the clock supplied from the control section 5, and converted to a signal according to the differential serial transmission system (LVDS transmission system) by the transmission output section 114, as shown in FIG. 1. The differential serial signal (LVDS signal) thus obtained is subjected to fast LVDS data transfer via the transmission line L2. Here, the scan driver control data, the sustain driver control data, other pulse generation control data, and the clock are input to the serializer 11 in parallel. These parallel data are converted to a serial form by the serializer 11.

The serial signal transferred via the transmission line L2 is converted to a parallel form. The original parallel signal is thus restored.

The scan driver control data, the sustain driver control data, and other pulse generation control data, which are output from the de-serializer 12, are input to the drive control section 22. The drive control section 22 generates a signal for turning on/off switching elements provided in the scan driver 20 based on the scan driver control data, generates a signal for turning on/off switching elements provided in the sustain drivers 19 and 21 based on the sustain driver control data, and generates a signal for turning on/off switching elements for generating a reset pulse or an erase pulse based on other pulse generation control data.

As described above, the clock contained in the parallel signal output from the de-serializer 12 is supplied to the drive control section 22. The drive control section 22 controls operation timing based on the clock.

A concrete example of the address resonance power supply circuit 17A and the address driver 17 will now be described with reference to FIGS. 5 and 6.

Figure 5:
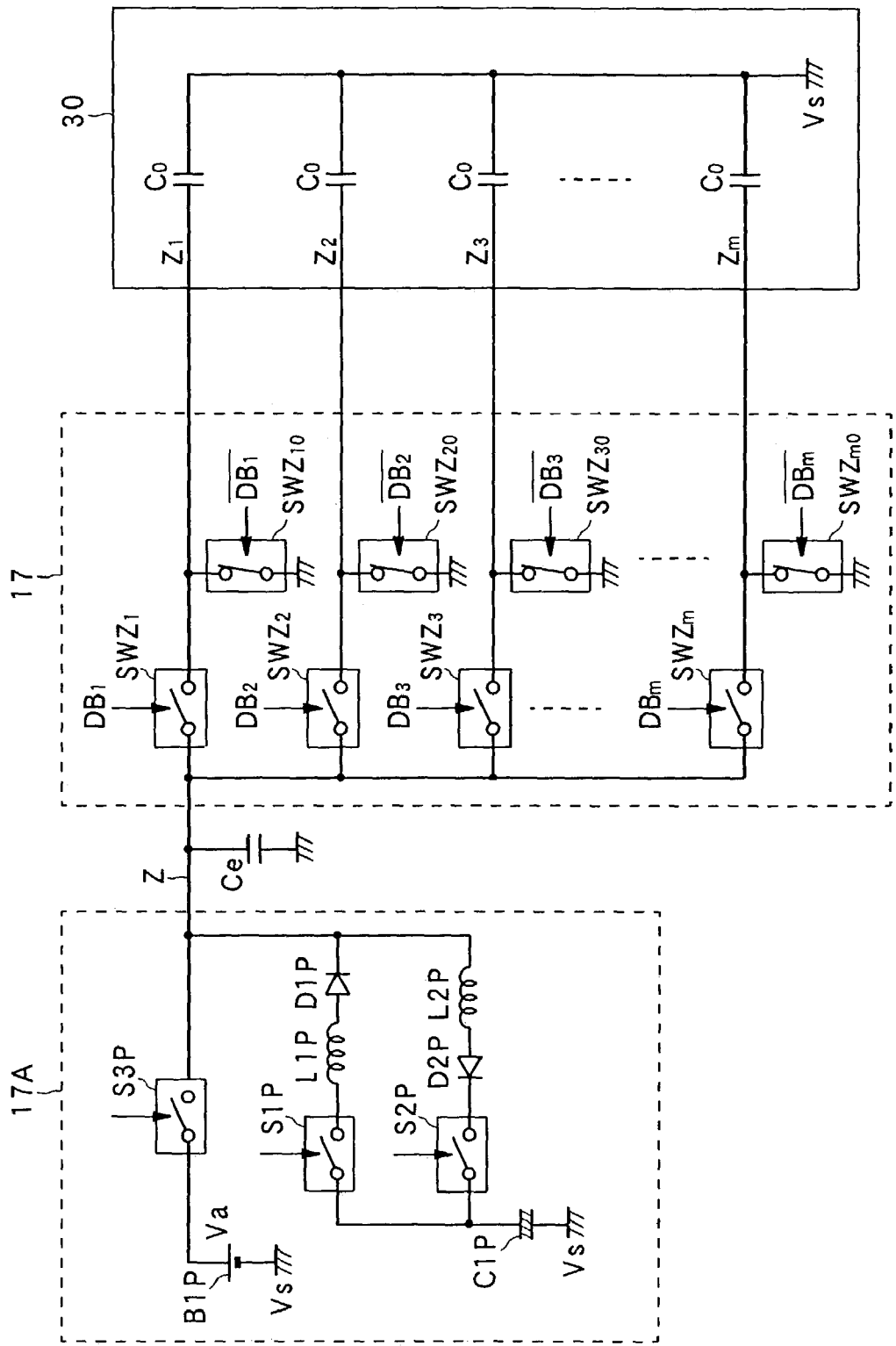
FIG. 5 is a diagram showing a configuration of an address resonance power supply circuit and an address driver.
Figure 6:
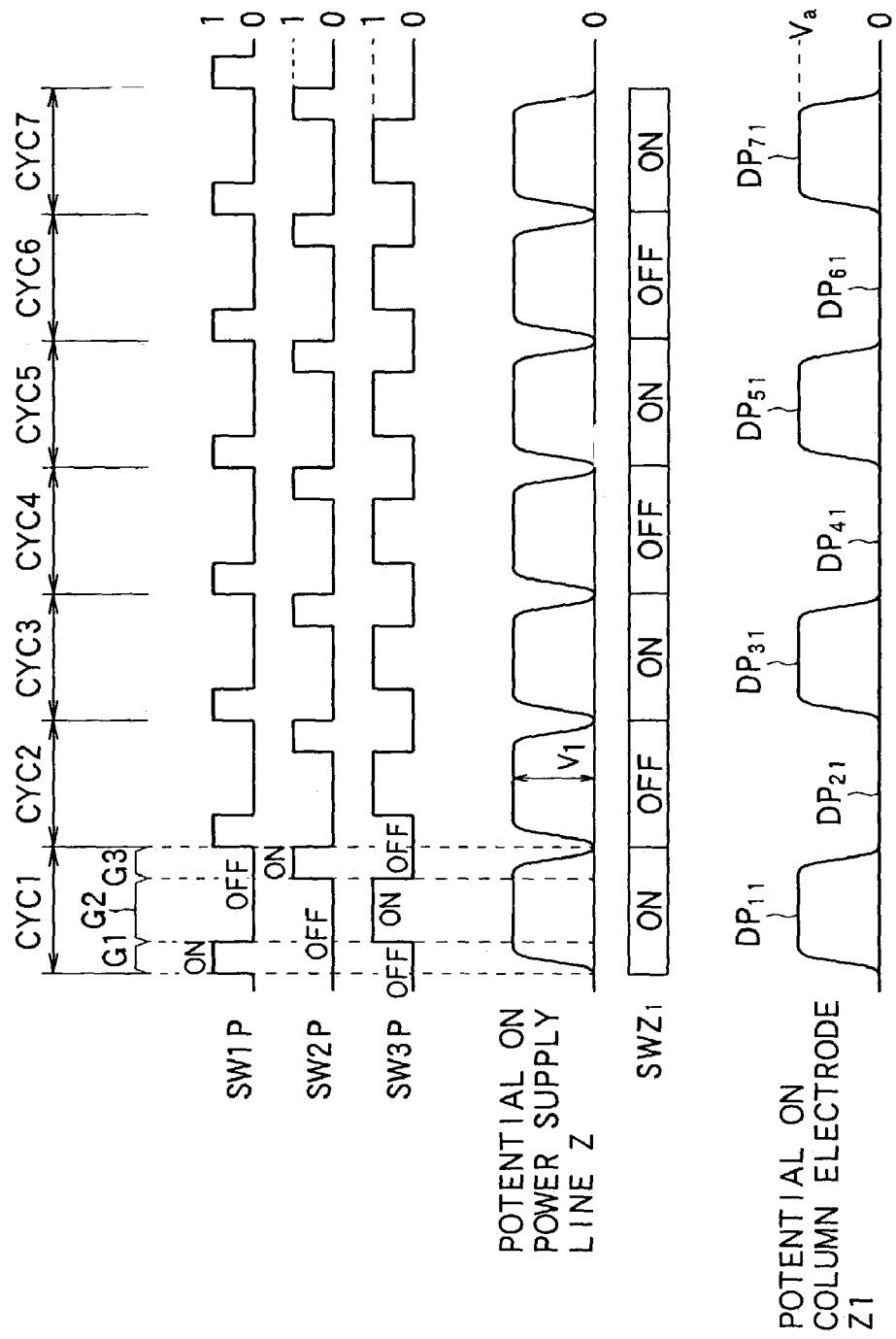
FIG. 6 is a diagram showing operation in an address term of an address resonance power supply circuit and an address driver.

The address resonance power supply circuit 17A shown in FIG. 5 generates a resonance pulse power supply potential having a predetermined amplitude, and outputs it to a power supply line Z. A capacitor C1P in the address resonance power supply circuit 17A is connected at a first end thereof to a grounding potential Vs of the plasma display 30. When a switching element S1P is in the on-state, then a potential generated at a second end of the capacitor C1P is applied to a power supply line Z via a coil L1P and a diode D1P. When a switching element S2P is in the on-state, then the potential at the power supply line Z is applied to the second end of the capacitor C1P via a coil L2P and a diode D2P. At this time, the capacitor C1P is charged by the potential on the power supply line Z. When a switching element S3P is in the on-state, then a power supply potential Va generated by a DC power supply B1P is applied onto the power supply line Z. A negative side terminal of the DC power supply B1P is connected to the grounding potential Vs.

As shown in FIG. 5, the address driver 17 includes switching elements SWZ1 to SWZm and SWZ1o to SWZmo, which are on/off controlled respectively independently according to pixel data bits DB1 to DBm corresponding to one row (m bits) output from the de-serializer 8. Each of the switching elements SWZ1 to SWZm assumes the on-state only when the pixel data bit DB supplied thereto is a logic level "1". The resonance pulse power supply potential applied to the power supply line Z is thus applied to the column electrodes Z1 to Zm of the plasma display panel 30. On the other hand, only when the pixel data bit DB is a logic level "0", each of the switching elements SWZ1o to SWZmo assumes the on-state, and makes the potential on the column electrode equal to the grounding potential Vs.

Hereafter, operation conducted by the address resonance power supply circuit 17A and the address driver 17 in the address interval will be described with reference to FIG. 6.

As shown in FIG. 5, the pulse generation control data output from the control section 5 and transferred is input to the address resonance power supply circuit 17A. The pulse generation control data is data for turning on/off switching elements S1P to S3P. Switching elements repeat inversion so that the switching elements S1P, S3P and S2P may repetitively turn on in the cited order according to the pulse generation control data. Such an operation periodically raises the potential on the power supply line Z. The periodic potential rising section coincides with the timing of scan conducted by the scan driver 20.

At this time, pixel data bits DB corresponding to predetermined column electrodes Z1 to Zm are input to the switching elements SWZ1 to SWZm and SWZ1o to SWZmo in the address driver 17 according to timing of potential rising on the power supply line Z. FIG. 6 shows the case where a bit sequence of the pixel data bits DB corresponding to first to seventh rows in an ith column is [1, 0, 1, 0, 1, 0, 1]. The pixel data bits DB is nothing but address data latched by the latch circuit 16. In the address interval, the operation heretofore described is executed successively for columns, and consequently cells can be set to lit cells/put-out cells for each of columns.

In this way, the pulse generation control data output from the control section 5 and transferred is input to the address resonance power supply circuit 17A, and the potential on the power supply line Z periodically rises according to the input timing of the pulse generation control data. Further, it is necessary to input the pixel data bits DB to the address driver 17 according to the timing of rising of the potential on the power supply line Z. In the display panel drive device 100 of the present embodiment, however, both the address data and the pulse generation control data are converted to the serial data by the serializer 7, and the serial data is transferred. Therefore, there is no fear that a skew may occur between the address data and the pulse generation control data. Therefore, it is possible to prevent occurrence of false operation caused by a deviation between the input timing of the pulse generation control data input to the address resonance power supply circuit 17A and the input timing of the pixel data bits DB input to the address driver 17.

Figure 7:
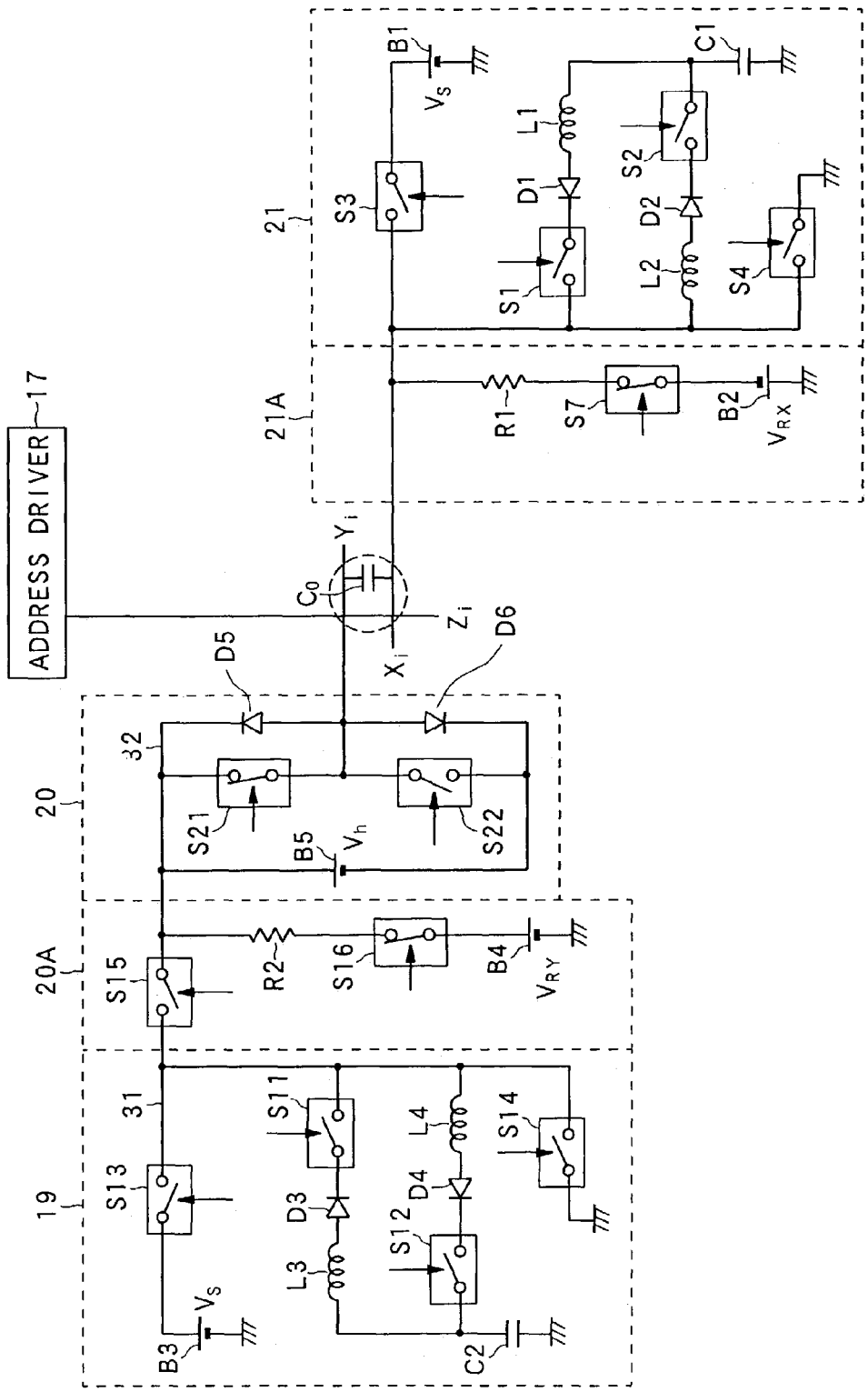
FIG. 7 is a diagram showing a configuration of a sustain driver and a scan driver.

A concrete example of the sustain drivers 19 and 21 and the scan driver 20 will now be described with reference to FIGS. 7 and 8.

The sustain driver 21 includes a DC power supply B1 for generating a DC voltage VS, switching elements S1 to S4, coils L1 and L2, diodes D1 and D2, and a capacitor C1. When the switching element S1 is in the on-state, then a potential on a first end of the capacitor C1 is applied to a row electrode Xi via the coil L1 and the diode D1. When the switching element S2 is in the on-state, then the potential on the row electrode Xi is applied to the first end of the capacitor C1 via the coil L2 and the diode D2. When the switching element S3 is in the on-state, then the voltage VS generated by the DC power supply B1 is applied to the row electrode Xi. When the switching element S4 is in the on-state, then the row electrode Xi is grounded.

The switching elements S1 to S4 in the sustain driver 21 are controlled to turn on/off based on the sustain driver control data output from the control section 5 and transferred.

The reset pulse generation circuit 21A includes a DC power supply B2 for generating a DC voltage VRx, a switching element S7, and a resistor R1. A positive side terminal of the DC power supply B2 is grounded, and a negative side terminal thereof is connected to the switching element S7. When the switching element S7 is in the on-state, then a voltage −VR, which is the negative side terminal voltage of the DC power supply B2, is applied to the row electrode Xi via the resistor R1.

The switching element S7 in the reset pulse generation circuit 21A is controlled to turn on/off based on the other pulse generation control data output from the control section 5 and transferred.

The sustain driver 19 includes a DC power supply B3 for generating a DC voltage VS, switching elements S11 to S14, coils L3 and L4, diodes D3 and D4, and a capacitor C2. When the switching element S11 is in the on-state, then a potential on a first end of the capacitor C2 is applied onto a line 31 via the coil L3 and the diode D3. When the switching element S12 is in the on-state, then the potential on the line 31 is applied to the first end of the capacitor C2 via the coil L4 and the diode D4. When the switching element S13 is in the on-state, then the voltage VS generated by the DC power supply B3 is applied to the line 31. When the switching element S14 is in the on-state, then the line 31 is grounded.

The switching elements S11 to S14 in the sustain driver 19 are controlled to turn on/off based on the sustain driver control data output from the control section 5 and transferred.

The reset pulse generation circuit 20A includes a DC power supply B4 for generating a DC voltage VRy (where |VRy|<|VRx|), switching elements S15 and S16, and a resistor R2. A negative side terminal of the DC power supply B4 is grounded, and a positive side terminal thereof is connected to the switching element S16. When the switching element S16 is in the on-state, then the voltage VRy, which is the positive side terminal voltage of the DC power supply B4, is applied onto a line 32 via the resister R2. When the switching element S15 is in the on-state, then the line 31 is connected to the line 32.

The switching elements S15 and S16 in the reset pulse generation circuit 20A are controlled to turn on/off based on the other pulse generation control data output from the control section 5 and transferred.

The scan driver 20 is provided for each of the row electrodes Y1 to Yn. The scan driver 20 includes a DC power supply B5 for generating a DC voltage Vh, switching elements S21 and S22, and diodes D5 and D6. When the switching element S21 is in the on-state, then a positive side terminal of the DC power supply B5, the row electrode Yi, and a cathode end of the diode D6 are connected together. When the switching element S22 is in the on-state, then a negative side terminal of the DC power supply B5, the row electrode Yi, and an anode end of the diode D5 are connected together.

The switching elements S21 and S22 in the scan driver 20 are controlled to turn on/off based on the scan pulse control data output from the control section 5 and transferred.

Figure 8:
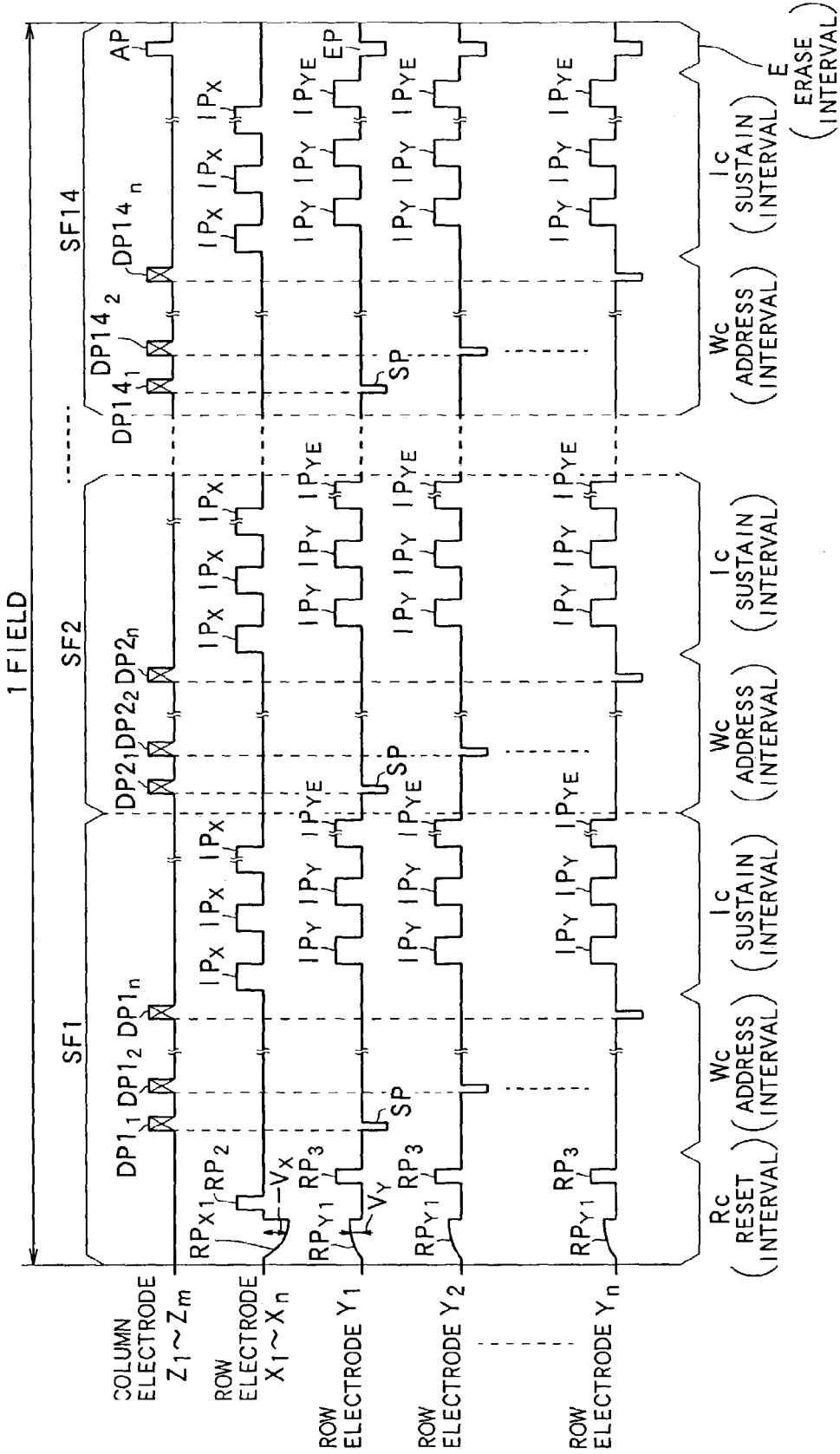
FIG. 8 is a diagram showing an example of application timing of various drive pulses applied to an address electrode (column electrode) and a row electrode.

FIG. 8 shows an example of application timing of various drive pulses applied from the address driver 17, the sustain drivers 19 and 21, the scan driver 20, and the reset pulse generation circuits 20A and 21A to the address electrodes (column electrodes) Z1 to Zm, the row electrodes X1 to Xn and Y1 to Yn.

As shown in FIG. 8, the reset pulse generation circuits 21A and 20A apply reset pulses RPX1 and RPY1 simultaneously to the row electrodes X1 to Xn and the Y1 to Yn in a reset interval Rc. As a result, discharge is caused between row electrodes in every cell, and a uniform wall charge is formed in each cell. As a result, all cells are initialized to lit cells.

In an address interval Wc, the address driver 17 applies a pixel data pulse group for each row successively to the column electrodes Z1 to Zm. The pixel data pulse group corresponds to the bit sequence of the pixel data bit DB. At this time, the scan driver 20 generates a scan pulse SP at the same timing as that of application of the pixel data pulse group, and applies the scan pulse SP successively to the row electrodes Y1 to Yn. At this time, only when the scan pulse SP is applied to one row electrode and the pixel data pulse of high voltage is applied to the address electrode (column electrode), discharge (selective erased discharge) is caused in the cell between the row electrode and the address electrode (column electrode) and the wall charge remaining in the cell is erased, the cell being changed to a put-out cell. The wall discharge remains in other cells, and those cells remain to be lit cells. Thus, in the address interval Wc, all cells are set to lit cells and put-out cells according to the address data.

In the sustain interval Ic, the sustain drivers 21 and 19 alternately apply sustain pulses IPX and IPY each having a pulse amplitude Vs to the row electrodes X1 to Xn and Y1 to Yn. At this time, only lit cells having remaining wall charge repetitively emit light in the address interval.

In a final subfield (a subfield SF14 in FIG. 8) in one field, an erase interval E is provided. In the erase interval E, the address driver 17 generates an erase pulse AP, and applies the erase pulse AP to the column electrodes Z1 to Zm. On the other hand, the scan driver 20 generates an erase pulse EP simultaneously with the erase pulse AP, and applies the erase pulse AP to each of the row electrodes Y1 to Yn. By simultaneous application of the erase pulses AP and EP, erase discharge occurs and the wall charge disappears in every cell.

Figure 9:
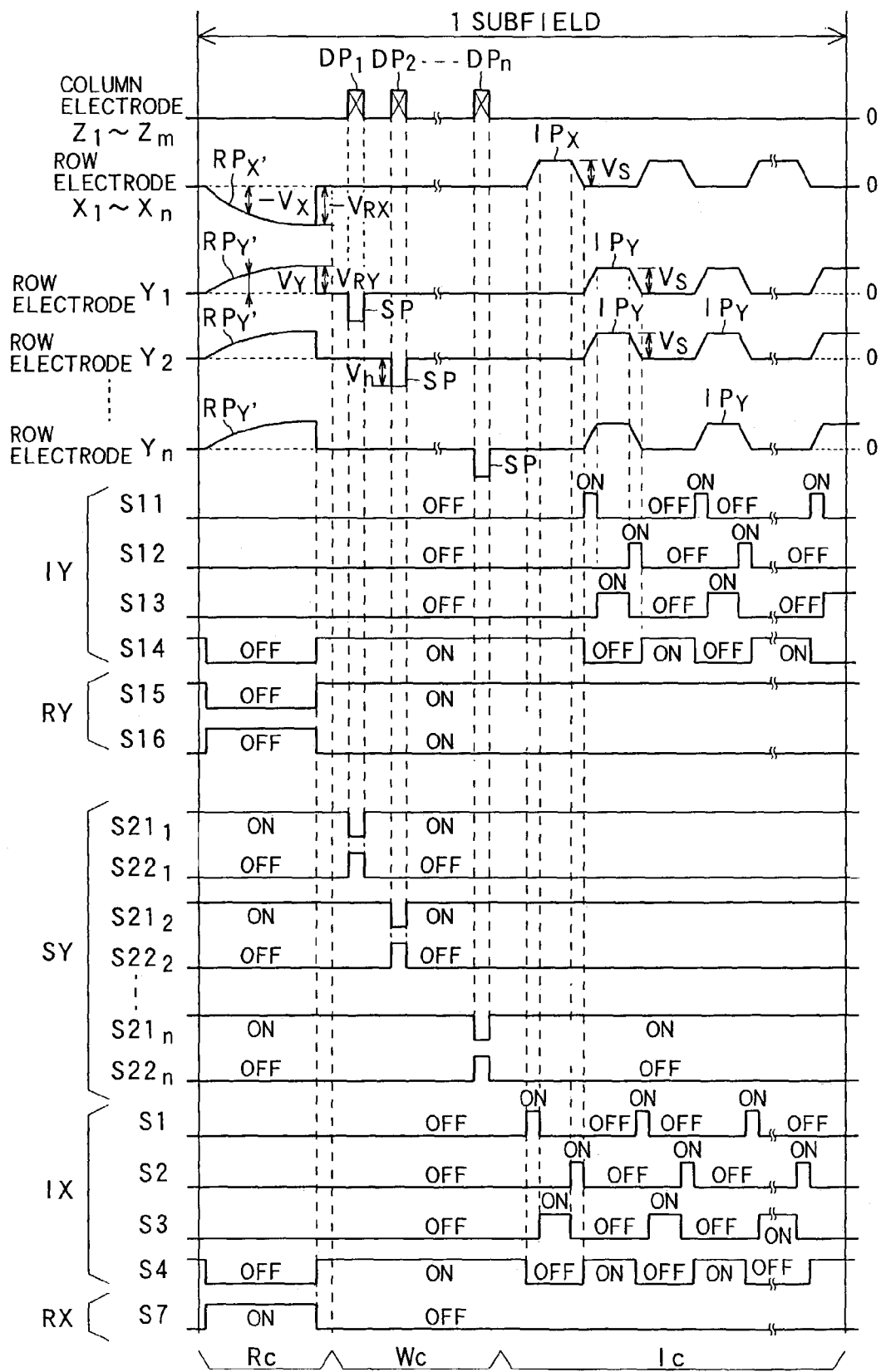
FIG. 9 is a diagram showing application timing of a drive pulse and switching timing of respective switch elements when the selective erasing address method is adopted.

FIG. 9 is a diagram showing application timing of drive pulses applied from the address driver 17, the sustain drivers 19 and 21, the scan driver 20, and the reset pulse generation circuits 20A and 21A to the plasma display panel 30, and switching timing of respective switch elements.

Detailed description of FIG. 9 will be omitted. By thus controlling a large number of switching elements provided in the address driver 17, the sustain drivers 19 and 21, the scan driver 20, and the reset pulse generation circuits 20A and 21A, however, desired drive pulses can be applied to respective electrodes in the plasma display panel 30.

In the display panel drive device 100 of the present embodiment, the address data is stored in the shift register 15 and the address data stored in the shift register 15 is latched, by using the shift clock generated by using the clock output from the control section 5, as heretofore described. In the display panel drive device 100, however, both the address data and the shift clock are converted to a series of serial data by the serializer 7, and the resultant serial data is transferred. So to speak, the shift clock is also converted to a data form simultaneously with the address data, and then both of them are transferred in a lump. Therefore, there is no fear that a skew may occur between the address data and the shift clock. Means for timing alignment, such as a delay circuit, is not needed.

Control data, such as the scan driver control data, the sustain driver control data and other pulse generation control data, and the clock are converted to a series of serial data by the serializer 11 and transferred. As a result, there is no fear that a skew may occur between these control data and the clock. Therefore, means for timing alignment, such as a delay circuit for canceling the skew, is not needed.

In the display panel drive device 100 of the present embodiment, both the address data and the pulse generation control data are converted to serial data by the serializer 7, and the resultant serial data is transferred. Therefore, there is no fear that a skew may occur between the address data and the pulse generation control data. Therefore, it is possible to prevent occurrence of false operation caused by a skew, and means for timing alignment, such as a delay circuit, is not needed.

In the present embodiment, the differential serial transmission system using LVDS is adopted. Therefore, there is an advantage that the display panel drive device 100 is hardly affected by noise and radiation of noise to the outside is reduced.

The address data, the pulse generation control data, the scan driver control data, the sustain driver control data, and other pulse generation control data correspond to "drive pulse generation control data" described in respective claims, respectively. The drive pulse generation control data are not limited to data shown in the embodiment.

In the embodiment, a plasma display panel is exemplified as the display panel. However, the present invention can be applied to various display panels such as a liquid crystal display panel and an EL display panel.

Second Embodiment

Figure 10:
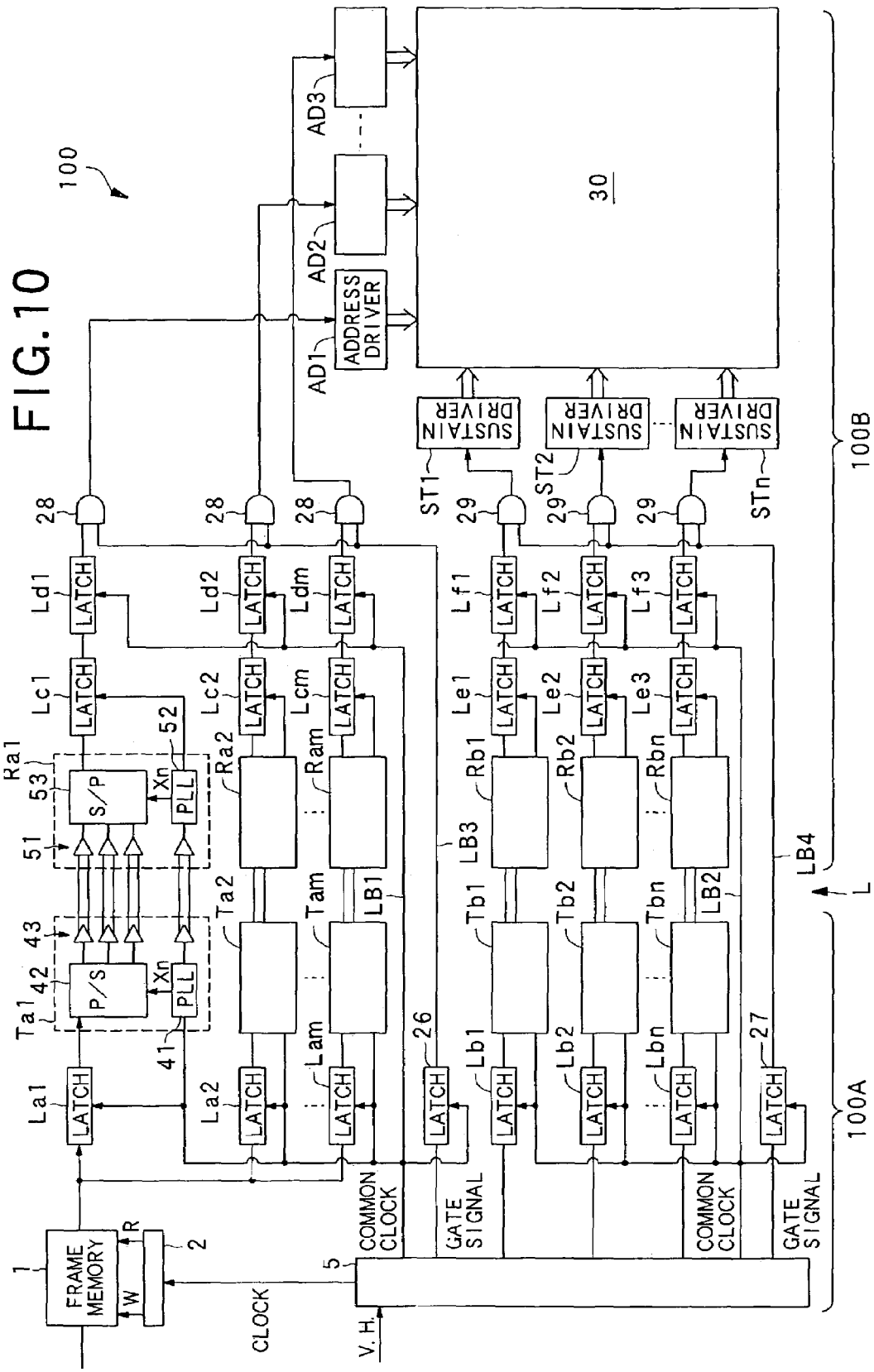
FIG. 10 is a block diagram showing a display panel drive device of the second embodiment.

Hereafter, an embodiment of a display panel drive device according to the present invention will be described with reference to FIG. 10. FIG. 10 is a block diagram showing a display panel drive device of the present embodiment. Components common to the first embodiment are denoted by like characters, and description of them will be omitted.

As shown in FIG. 10, a display panel drive device 100 of the present embodiment is formed by mutually connecting a display control section 100A and a drive section 100B by using a transmission line L formed of a twist cable.

As shown in FIG. 10, the display control section 100A includes a frame memory 1 for successively storing address data, a memory control section 2 for controlling writing address data into the frame memory 1 and reading address data from the frame memory 1, a control section 5 for controlling various sections of the device, latch circuits La1, La2, . . . Lam for latching the address data read out from the frame memory 1 based on a common clock supplied from the control section 5, transmitters Ta1, Ta2, . . . Tam for converting address data, which is multi-bit parallel data respectively latched by the latch circuits La1, La2, . . . Lam, to a serial differential signal, a latch circuit 26 for latching a gate signal output from the control section 5 based on the common clock supplied from the control section 5, latch circuits Lb1, Lb2, . . . Lbn for latching drive pulse generation control data output from the control section 5 based on a common clock supplied from the control section 5, transmitters Tb1, Tb2, . . . Tbn for converting the drive pulse generation control data respectively latched by the latch circuits Lb1, Lb2, . . . Lbn, to a serial differential signal, and a latch circuit 27 for latching a gate signal output from the control section 5 based on the common clock supplied from the control section 5.

The drive section 100B includes receivers Ra1, Ra2, . . . Ram for converting the serial differential signal transferred from the transmitters Ta1, Ta2, . . . Tam via a transmission line L respectively to parallel data, latch circuits Lc1, Lc2, . . . Lcm for latching the parallel data output from the receivers Ra1, Ra2, . . . Ram based on clocks supplied from the receivers Ra1, Ra2, . . . Ram, latch circuits Ld1, Ld2, . . . Ldm for latching parallel data output from the latch circuits Lc1, Lc2, . . . Lcm based on a common clock supplied from the control section 5, AND circuits 28, 28, . . . supplied with a gate signal output from a latch circuit 26 and parallel data output from the latch circuits Lc1, Lc2, . . . Lcm, address drivers AD1, AD2, . . . ADm respectively supplied with address data from the AND circuits 28, 28, . . . , receivers Rb1, Rb2, . . . Rbn for converting the serial differential signal transferred from the transmitters Tb1, Tb2, . . . Tbn via the transmission line L to parallel data, latch circuits Le1, Le2, . . . Len for latching the parallel data output from the receivers Rb1, Rb2, . . . Rbn based on clocks supplied from the receivers Rb1, Rb2, . . . Rbn, latch circuits Lf1, Lf2, . . . Lfn for latching parallel data output from the latch circuits Le1, Le2, . . . Len based on a common clock supplied from the control section 5, AND circuits 29, 29, . . . supplied with a gate signal output from a latch circuit 27 and parallel data output from the latch circuits Lf1, Lf2, . . . Lfn, and sustain drivers ST1, ST2, . . . STn respectively supplied with drive pulse generation control data supplied from the AND circuits 29, 29, . . . .

As shown in FIG. 10, the common clocks output from the control section 5 are transmitted via a clock transmission line LB1 and a clock transmission line LB2 included in the transmission line L, and supplied to the latch circuits Ld1, Ld2, . . . Ldm and Lf1, Lf2, . . . Lfn, respectively. The gate signals latched by the latch circuit 26 and the latch circuit 27 are transmitted via a gate signal transmission line LB3 and a gate signal transmission line LB4, and supplied to the AND circuit 28 and the AND circuit 29, respectively.

As described later, the latch circuits Ld1, Ld2, . . . Ldm are provided to align the address data in output timing by simultaneously latching the address data based on the common clock. The AND circuits 28, 28, . . . are provided to finely adjust the output timing of the address data based on the gate signal.

As shown in FIG. 10, each of the transmitters Ta1, Ta2, . . . Tam includes a PLL section 41 for receiving the common clock supplied from the control section 5 and generating a transmission clock, a parallel-to-serial conversion section 42 for converting the parallel data latched by the latch circuits La1, La2, . . . Lam to a serial form based on a clock that is supplied from the PLL section 41 and that is n times in frequency the common clock input from the control section 5, and a transmission output section 43 for conducting differential serial transmission on serial data output from the parallel-to-serial conversion section 42 via the transmission line L. Each of the transmitters Tb1, Tb2, . . . Tbn has a configuration similar to that of each of the transmitters Ta1, Ta2, . . . Tam. In FIG. 10, the configuration of only the transmitter Ta1 is shown.

Each of the receivers Ra1, Ra2, . . . Ram includes a reception section 51 for receiving the differential serial signal transferred via the transmission line, a PLL section 52 for receiving a transfer clock transferred via the transmission line and generating a clock, and a serial-to-parallel conversion section 53 for converting a serial signal output from the reception section 51 to parallel data based on a clock that is supplied from the PLL section 52 and that is n times in frequency the transfer clock. Each of the receivers Rb1, Rb2, . . . Rbn has a configuration similar to that of each of the receivers Ra1, Ra2, . . . Ram. In FIG. 10, the configuration of only the receiver Ra1 is shown.

As for the transmitters Ta1, Ta2, . . . Tam, the transmitters Tb1, Tb2, . . . Tbn, the receivers Ra1, Ra2, . . . Ram, and the receivers Rb1, Rb 2, . . . Rbn, both the transfer clock and the clock supplied from the PLL section 52 to the latch circuits Lc1, Lc2, . . . Lcm are the same in frequency as the common clock input to the PLL section 41.

Column electrodes and row electrodes are provided in the plasma display panel 30. The address drivers AD1, AD2, . . . ADm are connected to the individual column electrodes, and the sustain drivers ST1, ST2, . . . STn are connected to the individual row electrodes.

Since operation of the display panel drive device is the same as that of the first embodiment, description thereof will be omitted.

Figure 11:
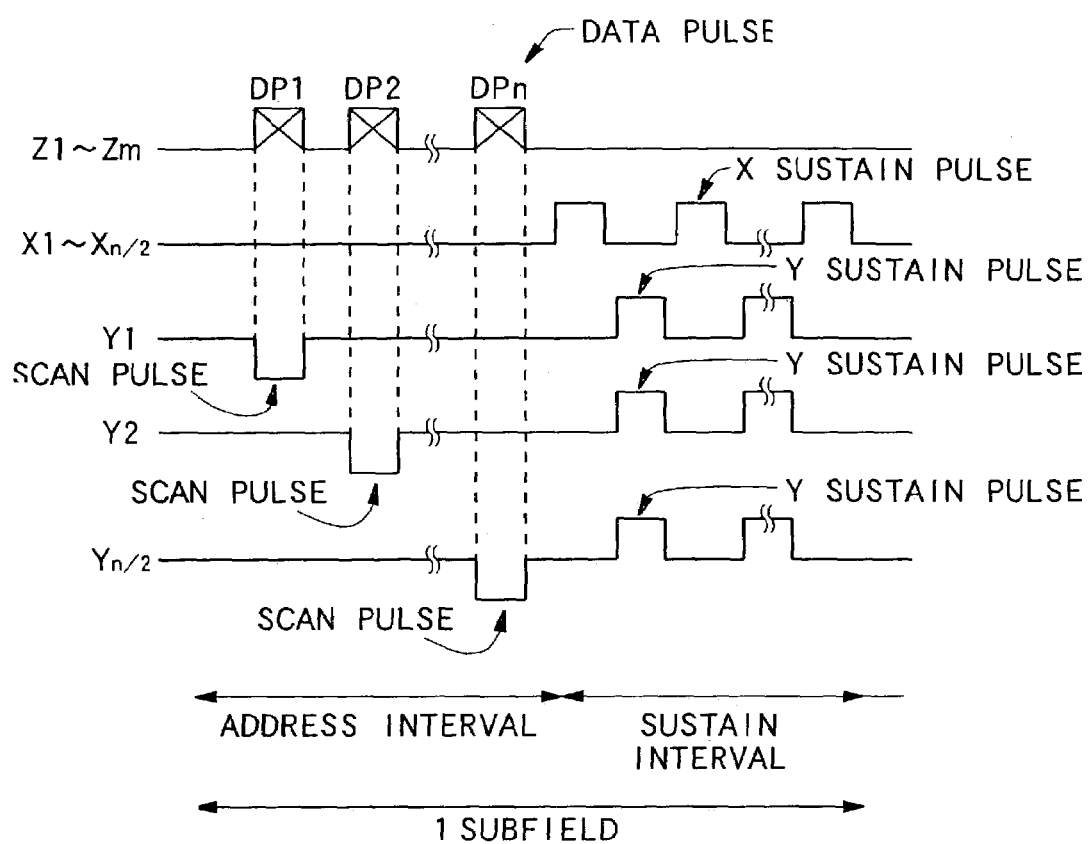
FIG. 11 is a diagram showing a drive pulse in one subfield.

FIG. 11 shows drive pulses supplied to respective electrodes. The second embodiment differs from the first embodiment in that row electrodes of n rows (where n is even) are referred to as row electrodes X1 to Xn/2 and row electrodes Y1 to Yn/2, the row electrodes X1 to Xn/2 are connected to the sustain drivers ST1, ST3, ST5, . . . STn–1 and the row electrodes Y1 to Yn/2 are connected to the sustain drivers ST2, ST4, ST6, . . . STn.

Signal processing for handling the address data and the drive pulse generation control data used to drive the plasma display panel 30 will now be described.

As shown in FIG. 10, the address data read out from the frame memory 1 is input to the address drivers AD1, AD2, . . . ADm via the latch circuits La1, La2, . . . Lam, the transmitters Ta1, Ta2, . . . Tam, the transmission line L, the receivers Ra1, Ra2, . . . Ram, the latch circuits Lc1, Lc2, . . . Lcm, the latch circuits Ld1, Ld2, . . . Ldm, and AND circuits 28, 28, . . . .

The drive pulse generation control data output from the control section 5 is input to the sustain drivers ST1, ST2, . . . STn via the latch circuits Lb1, Lb2, . . . Lbn, the transmitters Tb1, Tb2, . . . Tbn, the transmission line L, the receivers Rb1, Rb2, . . . Rbn, the latch circuits Le1, Le2, . . . Len, the latch circuits Lf1, Lf2, . . . Lfn, and AND circuits 29, 29, . . . .

In the display panel drive device 100, the address data is transmitted through different paths respectively for column electrodes, i.e., respectively for the address drivers AD1, AD2, . . . ADm as shown in FIG. 10. In the latch circuits Lc1, Lc2, . . . Lcm, the address data is latched based on a clock transmitted through the paths. Therefore, there is a possibility that the address data latched by the latch circuits Lc1, Lc2, . . . Lcm differs in latch timing according to the transmission path. In the display panel drive device 100, however, the address data is latched by the latch circuits Ld1, Ld2, . . . Ldm again based on the common clock transmitted from the control section 5 via a path different from that of the address data. The address data latched by the latch circuits Ld1, Ld2, . . . , Ldm is further adjusted finely in output timing in the AND circuits 28, 28, . . . based on the common gate signal. In the display panel drive device 100, therefore, it is possible to prevent timing deviation in the address data output from the AND circuits 28, 28, . . . and input to the address drivers AD1, AD2, . . . ADm.

In the display panel drive device 100, the drive pulse generation control data is transmitted through different paths respectively for row electrodes of the plasma display panel 30, i.e., respectively for the sustain drivers ST1, ST2, . . . STn. In the latch circuits Le1, Le2, . . . Len, the drive pulse generation control data is latched based on a clock transmitted through the paths. Therefore, there is a possibility that the drive pulse generation control data latched by the latch circuits Le1, Le2, . . . Len differs in latch timing according to the transmission path. In the display panel drive device 100, however, the drive pulse generation control data is latched by the latch circuits Lf1, Lf2, . . . Lfm again based on the common clock transmitted from the control section 5 via a path different from that of the drive pulse generation control data. The drive pulse generation control data latched by the latch circuits Lf1, Lf2, . . . , Lfn is further adjusted finely in output timing in the AND circuits 29, 29, . . . based on the common gate signal. In the display panel drive device 100, therefore, it is possible to prevent timing deviation in the drive pulse generation control data output from the AND circuits 29, 29, . . . and input to the sustain driver ST1, ST2, . . . STn.

In the display panel drive device 100 of the present embodiment, the address data transmitted through different transmission paths and received is latched by the same common clock as heretofore described. Therefore, a skew between the address data can be excluded. Furthermore, gate control using the common gate signal latched by the common clock is executed on the address data latched by the common clock. Therefore, it is possible to align the timing between the address data further accurately.

In the display panel drive device 100 of the present embodiment, the drive pulse generation control data transmitted through different transmission paths and received is latched by the same common clock. Therefore, a skew between the drive pulse generation control data can be excluded. Furthermore, gate control using the common gate signal latched by the common clock is executed on the drive pulse generation control data latched by the common clock. Therefore, it is possible to align the timing between the drive pulse generation control data further accurately.

In the present embodiment, the differential serial transmission system using LVDS is adopted. Therefore, there is an advantage that the display panel drive device 100 is hardly affected by noise and radiation of noise to the outside is reduced.

In the embodiment, the address data latched by the latch circuits Ld1, Ld2, . . . , Ldm is further adjusted finely in output timing in the AND circuits 28, 28, . . . based on the common gate signal. Furthermore, the drive pulse generation control data latched by the latch circuits Lf1, Lf2, . . . , Lfn is further adjusted finely in output timing in the AND circuits 29, 29, . . . based on the common gate signal. However, the display panel drive device according to the present invention is not restricted to such a configuration. In the embodiment, it is possible to omit the AND circuits 28, 28, . . . or the AND circuits 29, 29, . . . and align the signal timing by means of only latch operation using the latch circuits Ld1, Ld2, . . . , Ldm or the latch circuits Lf1, Lf2, . . . , Lfn. It is also possible to omit the latch circuits Ld1, Ld2, . . . , Ldm or the latch circuits Lf1, Lf2, . . . , Lfn and align the signal timing by means of only gate operation using the AND circuits 28, 28, . . . or the AND circuits 29, 29, . . . . It is also possible to adopt a configuration obtained by interchanging the positions of the latch circuits Ld1, Ld2, . . . , Ldm or the latch circuits Lf1, Lf2, . . . , Lfn and the positions of the AND circuits 28, 28, . . . or the AND circuits 29, 29, . . . .

In other words, the display panel device according to the present invention can have (1) a configuration using only latch circuits activated by the common clocks, (2) a configuration using only gate circuits activated by the gate signals, (3) a configuration having latch circuits activated by the common clocks in a preceding stage and gate circuits activated by the gate signals in a subsequent stage, or (4) a configuration having gate circuits activated by the gate signals in a preceding stage and latch circuits activated by the common clocks in a subsequent stage.

In the embodiment, a plasma display panel has been exemplified as the display panel. However, the present invention can be applied to various display panels such as a liquid crystal display panel and an EL display panel.

In the embodiment, application of the present invention to a display panel drive device for driving the plasma display panel 30 has been exemplified. However, the present invention is not restricted to the application to the display panel drive device, but the present invention can be applied widely to the case where a signal is transferred between devices via a transmission line.

The "address data" in the embodiment is included in "drive pulse generation control data" stated in claims.

Third Embodiment

Hereafter, an embodiment of a display panel drive device according to the present invention will be described with reference to FIG. 12. FIG. 12 is a block diagram showing a display panel drive device of the present embodiment. Components common to the first embodiment and the second embodiment are denoted by like characters, and description of them will be omitted.

As shown in FIG. 12, a display panel drive device 100 of the present embodiment is formed by mutually connecting a display control section 100A and a drive section 100B by using transmission lines L1 and L2.

As shown in FIG. 12, the display control section 100A includes a frame memory 1 for successively storing address data, a write control section 2 for writing address data into the frame memory 1, a read control section 3 for reading address data from the frame memory 1, a control section 5 for controlling various sections of the device, an AND circuit 6 for performing an AND operation on a clock A output from the control section 5 and a signal HA output from the read control section 3, a clock conversion section 6A for converting a clock for the address data, a serializer 7 for converting multi-bit parallel data, such as the address data, output from the clock conversion section 6A to a serial differential signal, a clock conversion section 6B for converting a clock for various control data read out from a control data memory 4A in the control section 5, and a serializer 11 for converting parallel data, such as various control data, output from the clock conversion section 6B to a serial differential signal.

The drive section 100B includes a de-serializer 8 for converting a serial differential signal transferred from the serializer 7 via the transmission line L1 to multi-bit parallel data, a de-serializer 12 for converting a serial differential signal transferred from the serializer 11 via the transmission line L2 to multi-bit parallel data, an address driver section 18 comprising a shift register 15 for storing address data corresponding to one line, a latch circuit 16 for latching address data corresponding to one line when address data corresponding to one line has been stored in the shift register 15, and an address driver 17 for generating data pulses corresponding to one line according to address data corresponding to one line and applying the data pulses simultaneously to column electrodes Z1 to Zm of a plasma display panel 30, a sustain driver 19 for applying a Y sustain pulse simultaneously to sustain electrodes Y1 to Yn of the plasma display panel 30, a scan driver 20 for applying a scan pulse successively to sustain electrodes Y1 to Yn, a sustain driver 21 for applying an X sustain pulse simultaneously to sustain electrodes X1 to Xn of the plasma display panel 30, and a drive control section 22 for controlling reset pulse genera-tion circuits 20A and 21A, for generating a reset pulse, the sustain driver 19, the scan driver 20 and the sustain driver 21.

As shown in FIG. 12, the clock conversion section 6A includes a FIFO (First-In First-Out) memory 61 for successively storing address data read out from the frame memory 1, a FIFO memory 62 for successively storing a shift clock output from the AND circuit 6, and a FIFO memory 63 for successively storing pulse generation control data output from the control section 5. As shown in FIG. 12, the FIFO memory 61, the FIFO memory 62 and the FIFO memory 63 respectively execute write operation according to a clock A output from the control section 5, and executes read operation according to a clock B output from the control section 5. The clock A and the clock B can be set in frequency independently of each other. For example, the frequency of the clock A and the frequency of the clock B can be set so as not to become the same and so as not to form an integer ratio.

The clock conversion section 6B includes a FIFO memory 64, a FIFO memory 65, a FIFO memory 66 and a FIFO memory 67 for successively storing scan driver control data, sustain driver control data, other control data, and a clock C, respectively. As shown in FIG. 12, the FIFO memory 64, the FIFO memory 65, the FIFO memory 66 and the FIFO memory 67 execute write operation according to a clock A output from the control section 5, and executes read operation according to a clock B output from the control section 5.

In the display panel drive device 100 of the present embodiment, the clock conversion section 6A and the clock conversion section 6B convert a clock frequency for handling the address data and various control data from the clock A to the clock B as described later. As a result, the clock frequency for operation of reading out data from the frame memory 1 and the control data memory 4A, and the clock frequency for data processing operation in a stage located after the clock conversion section 6A and the clock conversion section 6B can be set independently. Therefore, it becomes possible to select an optimum clock frequency for each operation.

As shown in FIG. 12, the serializer 7 includes a PLL section 71 for receiving a clock B from the control section 5 and generating a transmission clock, an input latch section 72 for latching address data read out from the frame memory 1, a shift clock output from the AND circuit 6, and pulse generation control data output from the control section 5 based on a clock B supplied from the control section 5, a parallel-to-serial conversion section 73 for serializing parallel data latched by the input latch section 72 based on a clock that is supplied from the PLL section 71 and that is n times in frequency the clock B supplied from the control section 5, and a transmission output section 74 for conducting differential serial transmission of serial data output from the parallel-to-serial conversion section 73, via the transmission line L1 formed of a twist cable or the like.

The de-serializer 8 includes a reception section 81 for receiving the differential serial signal transferred via the transmission line L1, a PLL section 82 for receiving a transfer clock transferred via the transmission line L1 and generating a clock, a serial-to-parallel conversion section 83 for converting a serial signal output from the reception section 81 to parallel data based on a clock that is supplied from the PLL section 82 and that is n times in frequency the transfer clock, and an output latch section 84 for latching the parallel data output from the serial-to-parallel conversion section 83 based on the clock supplied from the PLL section 82. The transfer clock and the clock supplied to the output latch section 84 have the same frequency as that of the clock B input to the PLL section 71.

As shown in FIG. 12, the serializer 11 includes a PLL section 111 for receiving a clock B from the control section 5 and generating a transmission clock, an input latch section 112 for latching scan driver control data, sustain driver control data, other pulse generation control data, and a clock, which are output from the control data memory 4A, based on the clock B output from the control section 5, a parallel-to-serial conversion section 113 for serializing parallel data latched by the input latch section 112 based on a clock that is n times in frequency the clock supplied from the control section 5, and a transmission output section 114 for conducting differential serial transmission of serial data output from the parallel-to-serial conversion section 113, via the transmission line L2 formed of a twist cable or the like.

The de-serializer 12 includes a reception section 121 for receiving the differential serial signal transferred via the transmission line L2, a PLL section 122 for receiving a transfer clock transferred via the transmission line L2 and generating a clock, a serial-to-parallel conversion section 123 for converting a serial signal output from the reception section 121 to parallel data based on a clock that is supplied from the PLL section 122 and that is n times in frequency the transfer clock, and an output latch section 124 for latching the parallel data output from the serial-to-parallel conversion section 123 based on the clock supplied from the PLL section 122. The transfer clock and the clock supplied to the output latch section 124 have the same frequency as that of the clock B input to the PLL section 111.

As shown in FIG. 12, the clock output from the de-serializer 12 is supplied to the drive control section 22. The drive control section 22 controls generation timing of a drive pulse based on this clock.

Since operation of the display panel drive device is the same as that of the first embodiment, description thereof will be omitted.

Signal processing for the address data and various control data used to drive the plasma display panel 30 will now be described.

As shown in FIG. 12, the address data read out from the frame memory 1, the shift clock output from the AND circuit 6, and the pulse generation control data read out from the control data memory 4A are successively written into the FIFO memory 61, the FIFO memory 62 and the FIFO memory 63 included in the clock conversion section 6A, respectively. The address data, the shift clock and the pulse generation control data read out respectively from the FIFO memory 61, the FIFO memory 62 and the FIFO memory 63 included in the clock conversion section 6A are input to the serializer 7.

As shown in FIG. 12, the clock A from the control section 5 is supplied to the write control section 2, the read control section 3 and the control data memory 4A. Operation of writing address data into the frame memory 1 and operation of reading address data from the frame memory 1 conducted by the write control section 2 and the read control section 3, and operation of reading pulse generation control data from the control data memory 4A are executed based on the clock A. Operation of writing the address data, the shift clock and the pulse generation control data into the FIFO memory 61, the FIFO memory 62 and the FIFO memory 63 included in the clock conversion section 6A is also executed based on the clock A.

On the other hand, operation of reading the address data, the shift clock and the pulse generation control data from the FIFO memory 61, the FIFO memory 62 and the FIFO memory 63 included in the clock conversion section 6A is also executed based on the clock B. Operation of the serializer 7 and the de-serializer 8 is also executed based on the clock B or the clock generated from the clock B. In this way, operation of reading data from the clock conversion section 6A and operation conducted in a stage located after the clock conversion section 6A are executed based on the clock B.

In the display panel drive device 100 of the present embodiment, the operation of reading data from the frame memory 1 and the control data memory 4A disposed in a stage preceding the clock conversion section 6A is executed based on the clock A, whereas the operation of reading data from the clock conversion section 6A and the operation conducted in a stage after the clock conversion section 6A are executed based on the clock B, as heretofore described. In other words, it is made possible by the clock conversion section 6A to separate the clock (clock A) for the operation of the frame memory 1 disposed before the clock conversion section 6A from the clock (clock B) for the operation of conducting processing on the data read out in a stage after the clock conversion section 6A. In the present embodiment, the frequency of the clock A and the frequency of the clock B can be set independently of each other.

The address data, the shift clock and the pulse generation control data read out from the clock conversion section 6A are latched by the input latch section 72 based on the clock B supplied from the control section 5 and converted to a serial form by the parallel-to-serial conversion section 73, and converted to a signal complying with the differential serial transmission system (LVDS transmission system) by the transmission output section 74. The differential serial signal (LVDS signal) thus obtained is subject to fast LVDS data transfer via the transmission line L1. Here, the address data is bit data (serial data) of each subfield for each of R, G and B cells. Serial data respectively of R, G and B are input to the serializer 7 in parallel together with the shift clock and the pulse generation control data. These parallel data are converted to a serial signal by the serializer 7.

The serial signal transferred via the transmission line L1 is converted to a parallel form. The original parallel signal is thus restored.

Since operation of the display panel drive device is the same as that of the first embodiment, description thereof will be omitted.

The pulse generation control data output from the de-serializer 8 is data for controlling on/off of a switch provided in an address resonance power supply circuit 17A (FIG. 12), which outputs a drive pulse toward the address driver 17. The address resonance power supply circuit 17A is a circuit for obtaining a predetermined power supply voltage by using resonance obtained when the switch is regularly turned on/off. Details of the address resonance power supply circuit 17A will be omitted.

As shown in FIG. 12, the scan driver control data, the sustain driver control data, other pulse generation control data and a clock C read out from the control data memory 4A are successively written into the FIFO memory 64, the FIFO memory 65, the FIFO memory 66 and the FIFO memory 67 included in the clock conversion section 6B. The scan driver control data, the sustain driver control data, other pulse generation control data and the clock C read out from the FIFO memory 64, the FIFO memory 65, the FIFO memory 66 and the FIFO memory 67 included in the clock conversion section 6B are input to the serializer 11.

As shown in FIG. 12, the control data memory 4A is supplied with the clock A from the control section 5. Operation of reading various control data from the control data memory 4A is executed based on the clock A. Operation of writing the scan driver control data, the sustain driver control data, other pulse generation control data and the clock C into the FIFO memory 64, the FIFO memory 65, the FIFO memory 66 and the FIFO memory 67 included in the clock conversion section 6B is also executed based on the clock A.

On the other hand, operation of reading the scan driver control data, the sustain driver control data, other pulse generation control data and the clock C from the FIFO memory 64, the FIFO memory 65, the FIFO memory 66 and the FIFO memory 67 included in the clock conversion section 6B is executed based on the clock B. Operation of the serializer 11 and the de-serializer 12 is also executed based on the clock B or a clock generated from the clock B. In this way, operation of reading data from the clock conversion section 6B and operation conducted in a stage located after the clock conversion section 6B are executed based on the clock B.

In the display panel drive device 100 of the present embodiment, the operation of reading data from the control data memory 4A disposed in a stage preceding the clock conversion section 6B is executed based on the clock A, whereas the operation of reading data from the clock conversion section 6B and the operation conducted in a stage after the clock conversion section 6B are executed based on the clock B, as heretofore described. In other words, it is made possible by the clock conversion section 6B to separate the clock (clock A) for the operation of reading respective control data from the control data memory 4A disposed before the clock conversion section 6B from the clock (clock B) for the operation of conducting processing on the respective control data read out in a stage after the clock conversion section 6B. In the present embodiment, the frequency of the clock A and the frequency of the clock B can be set independently of each other. Therefore, it becomes possible to set an optimum clock frequency for each operation.

As shown in FIG. 12, the scan driver control data, the sustain driver control data, other pulse generation control data and the clock C read out from the clock conversion section 6B are latched by the input latch section 112 based on the clock B supplied from the control section 5 and converted to a serial form by the parallel-to-serial conversion section 113, and converted to a signal complying with the differential serial transmission system (LVDS transmission system) by the transmission output section 114. The differential serial signal (LVDS signal) thus obtained is subject to fast LVDS data transfer via the transmission line L2. Here, the scan driver control data, the sustain driver control data, other pulse generation control data and the clock C are input to the serializer 11 in parallel. These parallel data are converted to a serial signal by the serializer 11.

The serial signal transferred via the transmission line L2 is converted to a parallel form. The original parallel signal is thus restored.

The scan driver control data, the sustain driver control data, and other pulse generation control data, which are output from the de-serializer 12, are input to the drive control section 22. The drive control section 22 generates a signal for turning on/off switching elements provided in the scan driver 20 based on the scan driver control data, generates a signal for turning on/off switching elements provided in the sustain drivers 19 and 21 based on the sustain driver control data, and generates a signal for turning on/off switching elements for generating a reset pulse or an erase pulse based on other pulse generation control data.

In the display panel drive device 100 of the present embodiment, the clock conversion section 6A and the clock conversion section 6B are provided as heretofore described. Therefore, it is possible to separate the clock for the data reading operation in a stage preceding the clock conversion section 6A or the clock conversion section 6B from the clock for the operation of conducting processing on the data read out in a stage after the clock conversion section 6A or the clock conversion section 6B. Therefore, the clock frequency of each operation can be optimized.

In the display panel drive device 100, both the address data and the shift clock are converted to a series of serial data by the serializer 7, and transferred. In other words, the address data and the shift clock are concurrently converted, and transferred in a lump. Therefore, there is no fear that a skew may occur between the address data and the shift clock. In the display panel drive device 100, the control data, such as the scan driver control data, sustain driver control data, and other pulse generation control data, and the clock C are converted to a series of serial data by the serializer 11, and transferred. Therefore, there is no fear that a skew may occur between these control data and the clock C. This results in an advantage that means for timing alignment, such as a delay circuit for canceling the skew, is not needed.

In the present embodiment, the differential serial transmission system using LVDS is adopted. Therefore, there is an advantage that the display panel drive device 100 is hardly affected by noise and radiation of noise to the outside is reduced.

The address data, the pulse generation control data, the scan driver control data, the sustain driver control data, and other pulse generation control data correspond to "drive pulse generation control data" described in respective claims, respectively. The drive pulse generation control data are not limited to data shown in the embodiment.

Each of the frame memory 1 and the control data memory 4A in the embodiment corresponds to a memory stated in claims.

In the embodiment, a plasma display panel is exemplified as the display panel. However, the present invention can be applied to various display panels such as a liquid crystal display panel and an EL display panel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-185710 filed on Jun. 26, 2002, Japanese Patent Application No. 2002-196346 filed on Jul. 4, 2002, Japanese Patent Application No. 2002-197699 filed on Jul. 5, 2002 and Japanese Patent Application No. 2002-216174 filed on Jul. 25, 2002 including the specification, claims, drawings and summary is incorporated herein by reference in its entirety.

What is claimed is:

1. A display panel drive device comprising:
a parallel-to-serial converter for conducting parallel-to-serial conversion on an input signal and outputting a serial signal;

a transmission section for converting the serial signal output from the parallel-to-serial converter to a signal complying with a differential serial transmission system and transferring a signal via a transmission line;
a reception section for receiving the signal transferred via the transmission line;
a serial-to-parallel converter for conducting serial-to-parallel conversion on the signal received by the reception section and outputting a parallel signal; and
a drive pulse output section for generating a drive pulse to drive a display panel based on the parallel signal output by the serial-to-parallel converter;
a display control section for controlling display on a display panel;
a drive section for driving the display panel based on a signal supplied from the display control section; and
a data transfer device for transferring data between the display control section and the drive section,
wherein the display control section comprises a storage section for storing address data, a readout section for reading out address data stored in the storage section, and a shift clock generation section for generating a shift clock,
the drive section comprises a shift register for successively storing the address data based on the shift clock, a latch circuit for latching the address data stored in the shift register, and a drive circuit for driving the display panel based on the address data output from the latch circuit,
the input signal comprises the address data and the shift clock,
the data transfer device comprises the parallel-to-serial converter and the transmission section, and
the drive section comprises the reception section and the serial-to-parallel converter.

2. A display panel drive device comprising:
a parallel-to-serial converter for conducting parallel-to-serial conversion on an input signal and outputting a serial signal
a transmission section for converting the serial signal output from the parallel-to-serial converter to a signal complying with a differential serial transmission system and transferring a signal via a transmission line;
a reception section for receiving the signal transferred via the transmission line;
a serial-to-parallel converter for conducting serial-to-parallel conversion on the signal received by the reception section and outputting a parallel signal; and
a drive pulse output section for generating a drive pulse to drive a display panel based on the parallel signal output by the serial-to-parallel converter,
wherein the input signal comprises the address data and drive pulse generation control data,
the display panel drive device comprising:
a display control section for controlling display on a display panel;
a drive section for driving the display panel based on a signal supplied from the display control section; and
a data transfer device for transferring data between the display control section and the drive section,
wherein the data transfer device comprises the parallel-to-serial converter and the transmission section, and
the drive section comprises the reception section and the serial-to-parallel converter,
wherein the display control section comprises a storage section for storing address data, a readout section for reading out address data stored in the storage section, and a control data generation section for generating drive pulse generation control data,
the drive section comprises a shift register for successively storing the address data, a latch circuit for latching the address data stored in the shift register, a drive circuit for driving the display panel based on the address data output from the latch circuit, and a power supply circuit for applying a power supply voltage to the drive circuit based on the drive pulse generation control data.

3. A display panel drive device comprising a display control section for controlling display on a display panel, a drive section for driving the display panel based on a signal supplied from the display control section, and a data transfer device for transferring data between the display control section and the drive section, wherein
the data transfer device comprises a plurality of transmitters in the display control section, and comprises a plurality of receivers respectively combined with the transmitters and included in the drive section,
each of the transmitters comprises a first PLL circuit for generating a first clock equivalent in frequency to n times an input clock and a second clock equivalent in frequency to the input clock in synchronism with the input clock, a parallel-to-serial converter for conducting parallel-to-serial conversion on drive pulse generation control data based on the first clock output from the first PLL circuit, and a transmission section for converting a serial signal output from the parallel-to-serial converter to a signal complying with a differential serial transmission system and transferring the signal toward the drive section via a transmission line, and
each of the receivers comprises a reception section for receiving the drive pulse generation control data transferred from corresponding one of the transmitters via the transmission line, a second PLL circuit for generating a third clock equivalent in frequency to n times the first clock output and transmitted from the first PLL circuit and a fourth clock equivalent in frequency to the first clock in synchronism with the first clock, and a serial-to-parallel converter for conducting serial-to-parallel conversion on the received drive pulse generation control data based on the third clock output from the second PLL circuit.

4. The display panel drive device according to claim 3, further comprising a clock transmission device for transmitting the input clock as a common clock for the receivers, and a first latch circuit for latching signals output from the receivers based on the common clock transmitted by the clock transmission device.

5. The display panel drive device according to claim 4, comprising a gate signal transmission device for transmitting a gate signal latched based on the input clock toward the drive section, and a gate circuit for gating a signal latched by the first latch circuit based on the gate signal transmitted by the gate signal transmission device.

6. The display panel drive device according to claim 4, wherein a second latch circuit for latching the drive pulse generation control data based on the input clock is provided before the parallel-to-serial converter, and a third latch circuit for latching a signal output from the serial-to-parallel converter based on the fourth clock is provided between the serial-to-parallel converter and the first latch circuit.

7. The display panel drive device according to claim 3, further comprising a gate signal transmission device for transmitting a gate signal latched based on the input clock toward the drive section, and a gate circuit for gating a signal output from the receivers based on the gate signal transmitted by the gate signal transmission device.

8. The display panel drive device according to claim 7, comprising a clock transmission device for transmitting the input clock as a common clock for the receivers, and a latch circuit for latching a signal output from the gate circuit based on the common clock transmitted by the clock transmission device.

9. A display panel drive device comprising a memory for storing display control data, a readout device for reading out the display control data from the memory based on a first clock having a first frequency, a data transfer device for transferring the display control data read out by the readout device, and a display panel drive section for driving a display panel based on the display control data transferred by the data transfer device,
wherein a clock conversion circuit is provided between the memory and the data transfer device,
wherein the clock conversion circuit comprises a FIFO memory, and
the display control data is written into the FIFO memory based on the first clock, and the display control data written into the FIFO memory is read out based on a second clock having a second frequency preset independently of the first clock.

10. The display panel drive device according to claim 9, wherein the data transfer device comprises:
a first PLL circuit for generating a third clock equivalent in frequency to n times the second clock and a fourth clock having the second frequency in synchronism with the second clock;
a parallel-to-serial converter for conducting parallel-to-serial conversion on the display control data based on the third clock output from the first PLL circuit;
a transfer section for converting a serial signal output from the parallel-to-serial converter to a signal complying with a differential serial transmission system and transferring the signal via a transmission line;
a reception section for receiving the display control data transferred via the transmission line;
a second PLL circuit for generating a fifth clock equivalent in frequency to n times the fourth clock output from the first PLL circuit and transmitted via the transmission line in synchronism with the fourth clock, and a sixth clock equivalent in frequency to the fourth clock; and
a serial-to-parallel converter for conducting serial-to-parallel conversion on the received display control data based on the fifth clock output from the second PLL circuit.

11. A display control device having a display control section of a display panel drive device comprising a display control section for controlling display on a display panel, a drive section for driving the display panel based on a signal supplied from the display control section, and a data transfer device for transferring data between the display control section and the drive section,
wherein the data transfer device comprises in the display control section:
a parallel-to-serial converter for conducting parallel-to-serial conversion on an input signal and outputting a serial signal; and
a transmission section for converting the serial signal output from the parallel-to-serial converter to a signal complying with a differential serial transmission system and transferring a signal toward the drive section via a transmission line, and the data transfer device comprises in the drive section:
a reception section for receiving the signal transferred via the transmission line; and
a serial-to-parallel converter for conducting serial-to-parallel conversion on the signal received by the reception section,
wherein the display control section comprises:
a storage section for storing address data;
a readout section for reading out address data stored in the storage section, and
a shift clock generation section for generating a shift clock,
the drive section comprises a shift register for successively storing the address data based on the shift clock, a latch circuit for latching the address data stored in the shift register, and a drive circuit for driving the display panel based on the address data output from the latch circuit,
the input signal comprises the address data and the shift clock,
the data transfer device comprises the parallel-to-serial converter and the transmission section, and
the drive section comprises the reception section and the serial-to-parallel converter.

12. A display control device having a display control section of a display panel drive device comprising a display control section for controlling display on a display panel, a drive section for driving the display panel based on a signal supplied from the display control section, and a data transfer device for transferring data between the display control section and the drive section,
wherein the data transfer device comprises in the display control section:
a parallel-to-serial converter for conducting parallel-to-serial conversion on an input signal and outputting a serial signal; and
a transmission section for converting the serial signal output from the parallel-to-serial converter to a signal complying with a differential serial transmission system and transferring a signal toward the drive section via a transmission line, and
the data transfer device comprises in the drive section:
a reception section for receiving the signal transferred via the transmission line; and
a serial-to-parallel converter for conducting serial-to-parallel conversion on the signal received by the reception section,
wherein the input signal comprises drive pulse generation control data and a clock,
wherein the display control section comprises a storage section for storing address data, a readout section for reading out address data stored in the storage section, and a control data generation section for generating drive pulse generation control data,
the drive section comprises a shift register for successively storing the address data, a latch circuit for latching the address data stored in the shift register, a drive circuit for driving the display panel based on the address data output from the latch circuit, and a power supply circuit for applying a power supply voltage to the drive circuit based on the drive pulse generation control data.

13. A display control device having a display control section of a display panel drive device comprising a display control section for controlling display on a display panel, a drive section for driving the display panel based on a signal supplied from the display control section, and a data transfer device for transferring data between the display control section and the drive section, wherein the data transfer device comprises a plurality of transmitters in the display control section, and comprises a plurality of receivers respectively combined with the transmitters and included in the drive section, each of the transmitters comprises a first PLL circuit for generating a first clock equivalent in frequency to n times an input clock and a second clock equivalent in frequency to the input clock in synchronism with the input clock, a parallel-to-serial converter for conducting parallel-to-serial conversion on drive pulse generation control data based on the first clock output from the first PLL circuit, and a transmission section for converting a serial signal output from the parallel-to-serial converter to a signal complying with a differential serial transmission system and transferring the signal toward the drive section via a transmission line, and each of the receivers comprises a reception section for receiving the drive pulse generation control data transferred from corresponding one of the transmitters via the transmission line, a second PLL circuit for generating a third clock equivalent in frequency to n times the first clock output and transmitted from the first PLL circuit and a fourth clock equivalent in frequency to the first clock in synchronism with the first clock, and a serial-to-parallel converter for conducting serial-to-parallel conversion on the received drive pulse generation control data based on the third clock output from the second PLL circuit.

14. The display control device according to claim 13, further comprising a clock transmission device for transmitting the input clock as a common clock for the receivers, and a first latch circuit for latching signals output from the receivers based on the common clock transmitted by the clock transmission device.

15. The display control device according to claim 14, comprising a gate signal transmission device for transmitting a gate signal latched based on the input clock toward the drive section, and a gate circuit for gating a signal latched by the first latch circuit based on the gate signal transmitted by the signal transmission device.

16. The display control device according to claim 14, wherein a second latch circuit for latching the drive pulse generation control data based on the input clock is provided before the parallel-to-serial converter, and a third latch circuit for latching a signal output from the serial-to-parallel converter based on the fourth clock is provided between the serial-to-parallel converter and the first latch circuit.

17. The display control device according to claim 13, further comprising a gate signal transmission device for transmitting a gate signal latched based on the input clock toward the drive section, and a gate circuit for gating a signal output from the receivers based on the gate signal transmitted by the gate signal transmission device.

18. The display control device according to claim 17, comprising a clock transmission device for transmitting the input clock as a common clock for the receivers, and a latch circuit for latching a signal output from the gate circuit based on the common clock transmitted by the clock transmission device.

19. A drive device having a drive section of a display panel drive device comprising a display control section for controlling display on a display panel, a drive section for driving the display panel based on a signal supplied from the display control section, and a data transfer device for transferring data between the display control section and the drive section, wherein the data transfer device comprises in the display control section:

a parallel-to-serial converter for conducting parallel-to-serial conversion on an input signal and outputting a serial signal; and a transmission section for converting the serial signal output from the parallel-to-serial converter to a signal complying with a differential serial transmission system and transferring a signal toward the drive section via a transmission line, and the drive section comprises:

a reception section for receiving the signal transferred via the transmission line; and a serial-to-parallel converter for conducting serial-to-parallel conversion on the signal received by the reception section, wherein the display control section comprises a storage section for storing address data, a readout section for reading out address data stored in the storage section, and a shift clock generation section for generating a shift clock, the drive section comprises a shift register for successively storing the address data based on the shift clock, a latch circuit for latching the address data stored in the shift register, and a drive circuit for driving the display panel based on the address data output from the latch circuit, the input signal comprises the address data and the shift clock, the data transfer device comprises the parallel-to-serial converter and the transmission section, and the drive section comprises the reception section and the serial-to-parallel converter.

20. A drive device having a drive section of a display panel drive device comprising a display control section for controlling display on a display panel, a drive section for driving the display panel based on a signal supplied from the display control section, and a data transfer device for transferring data between the display control section and the drive section, wherein the data transfer device comprises in the display control section:

a parallel-to-serial converter for conducting parallel-to-serial conversion on an input signal and outputting a serial signal; and a transmission section for converting the serial signal output from the parallel-to-serial converter to a signal complying with a differential serial transmission system and transferring a signal toward the drive section via a transmission line, and the drive section comprises:

a reception section for receiving the signal transferred via the transmission line; and a serial-to-parallel converter for conducting serial-to-parallel conversion on the signal received by the reception section, wherein the input signal comprises drive pulse generation control data and a clock, wherein the display control section comprises a storage section for storing address data, a readout section for reading out address data stored in the storage section, and a control data generation section for generating drive pulse generation control data, the drive section comprises a shift register for successively storing the address data, a latch circuit for latching the address data stored in the shift register, a drive circuit for driving the display panel based on the address data output from the latch circuit, and a power supply circuit for applying a power supply voltage to the drive circuit based on the drive pulse generation control data.

21. A drive device having a drive section of a display panel drive device comprising a display control section for controlling display on a display panel, a drive section for driving the display panel based on a signal supplied from the display control section, and a data transfer device for transferring data between the display control section and the drive section, wherein the data transfer device comprises a plurality of transmitters in the display control section, and comprises a plurality of receivers respectively combined with the transmitters and included in the drive section, each of the transmitters comprises a first PLL circuit for generating a first clock equivalent in frequency to n times an input clock and a second clock equivalent in frequency to the input clock in synchronism with the input clock, a parallel-to-serial converter for conducting parallel-to-serial conversion on drive pulse generation control data based on the first clock output from the first PLL circuit, and a transmission section for converting a serial signal output from the parallel-to-serial converter to a signal complying with a differential serial transmission system and transferring the signal toward the drive section via a transmission line, and each of the receivers comprises a reception section for receiving the drive pulse generation control data transferred from corresponding one of the transmitters via the transmission line, a second PLL circuit for generating a third clock equivalent in frequency to n times the first clock output and transmitted from the first PLL circuit and a fourth clock equivalent in frequency to the first clock in synchronism with the first clock, and a serial-to-parallel converter for conducting serial-to-parallel conversion on the received drive pulse generation control data based on the third clock output from the second PLL circuit.

22. The drive device according to claim 21, further comprising a clock transmission device for transmitting the input clock as a common clock for the receivers, and a first latch circuit for latching signals output from the receivers based on the common clock transmitted by the clock transmission device.

23. The drive device according to claim 22, comprising a gate signal transmission device for transmitting a gate signal latched based on the input clock toward the drive section, and a gate circuit for gating a signal latched by the first latch circuit based on the gate signal transmitted by the gate signal transmission device.

24. The drive device according to claim 22, wherein a second latch circuit for latching the drive pulse generation control data based on the input clock is provided before the parallel-to-serial converter, and a third latch circuit for latching a signal output from the serial-to-parallel converter based on the fourth clock is provided between the serial-to-parallel converter and the first latch circuit.

25. The drive device according to claim 21, further comprising a gate signal transmission device for transmitting a gate signal latched based on the input clock toward the drive section, and a gate circuit for gating a signal output from the receivers based on the gate signal transmitted by the gate signal transmission device.

26. The drive device according to claim 25, comprising a clock transmission device for transmitting the input clock as a common clock for the receivers, and a latch circuit for latching a signal output from the gate circuit based on the common clock transmitted by the clock transmission device.

27. A data transfer system for conducting data transfer between a first device and a second device, wherein the first device comprises a plurality of transmitters, and the second device comprises a plurality of receivers respectively combined with the transmitters, each of the transmitters comprises a first PLL circuit for generating a first clock equivalent in frequency to n times an input clock and a second clock equivalent in frequency to the input clock in synchronism with the input clock, a parallel-to-serial converter for conducting parallel-to-serial conversion on data based on the first clock output from the first PLL circuit, and a transmission section for converting a serial signal output from the parallel-to-serial converter to a signal complying with a differential serial transmission system and transferring the signal toward the second device via a transmission line, and each of the receivers comprises a reception section for receiving the data transferred from corresponding one of the transmitters via the transmission line, a second PLL circuit for generating a third clock equivalent in frequency to n times the first clock output and transmitted from the first PLL circuit and a fourth clock equivalent in frequency to the first clock in synchronism with the first clock, and a serial-to-parallel converter for conducting serial-to-parallel conversion on the received data based on the third clock output from the second PLL circuit.

28. The data transfer system according to claim 27, comprising a clock transmission device for transmitting the input clock as a common clock for the receivers, and a first latch circuit for latching signals output from the receivers based on the common clock transmitted by the clock transmission device.

29. The data transfer system according to claim 28, comprising a gate signal transmission device for transmitting a gate signal latched based on the input clock toward the second device, and a gate circuit for gating a signal latched by the first latch circuit based on the gate signal transmitted by the gate signal transmission device.

30. The data transfer system according to claim 28, wherein a second latch circuit for latching the data based on the input clock is provided before the parallel-to-serial converter, and a third latch circuit for latching a signal output from the serial-to-parallel converter based on the fourth clock is provided between the serial-to-parallel converter and the first latch circuit.

31. The data transfer system according to claim 27, further comprising a gate signal transmission device for transmitting a gate signal latched based on the input clock toward the second device, and a gate circuit for gating a signal output from the receivers based on the gate signal transmitted by the gate signal transmission device.

32. The data transfer system according to claim 31, comprising a clock transmission device for transmitting the input clock as a common clock for the receivers, and a latch circuit for latching a signal output from the gate circuit based on the common clock transmitted by the clock transmission device.

33. A data transmission device having a first device comprising a data transfer system for conducting data transfer between a first device and a second device, wherein the first device comprises a plurality of transmitters, and the second device comprises a plurality of receivers respectively combined with the transmitters, each of the transmitters comprises a first PLL circuit for generating a first clock equivalent in frequency to n times an input clock and a second clock equivalent in frequency to the input clock in synchronism with the input clock, a parallel-to-serial converter for conducting parallel-to-serial conversion on data based on the first clock output from the first PLL circuit, and a transmission section for converting a serial signal output from the parallel-to-serial converter to a signal complying with a differential serial transmission system and transferring the signal toward the second device via a transmission line, and each of the receivers comprises a reception section for receiving the data transferred from corresponding one of the transmitters via the transmission line, a second PLL circuit for generating a third clock equivalent in frequency to n times the first clock output and transmitted from the first PLL circuit and a fourth clock equivalent in frequency to the first clock in synchronism with the first clock, and a serial-to-parallel converter for conducting serial-to-parallel conversion on the received data based on the third clock output from the second PLL circuit.

34. The data transmission device according to claim 33, wherein the data transfer system comprises a clock transmission device for transmitting the input clock as a common clock for the receivers, and a first latch circuit for latching signals output from the receivers based on the common clock transmitted by the clock transmission device.

35. The data transmission device according to claim 34, wherein the data transfer system comprises a gate signal transmission device for transmitting a gate signal latched based on the input clock toward the second device, and a gate circuit for gating a signal latched by the first latch circuit based on the gate signal transmitted by the gate signal transmission device.

36. The data transmission device according to claim 34, wherein a second latch circuit for latching the data based on the input clock is provided before the parallel-to-serial converter, and a third latch circuit for latching a signal output from the serial-to-parallel converter based on the fourth clock is provided between the serial-to-parallel converter and the first latch circuit.

37. The data transmission device according to claim 33, wherein the data transfer system comprises a gate signal transmission device for transmitting a gate signal latched based on the input clock toward the second device, and a gate circuit for gating a signal output from the receivers based on the gate signal transmitted by the gate signal transmission device.

38. The data transmission device according to claim 37, wherein the data transfer system comprises a clock transmission device for transmitting the input clock as a common clock for the receivers, and a latch circuit for latching a signal output from the gate circuit based on the common clock transmitted by the clock transmission device.

39. A data reception device having a second device comprising a data transfer system for conducting data transfer between a first device and a second device, wherein the first device comprises a plurality of transmitters, and the second device comprises a plurality of receivers respectively combined with the transmitters, each of the transmitters comprises a first PLL circuit for generating a first clock equivalent in frequency to n times an input clock and a second clock equivalent in frequency to the input clock in synchronism with the input clock, a parallel-to-serial converter for conducting parallel-to-serial conversion on data based on the first clock output from the first PLL circuit, and a transmission section for converting a serial signal output from the parallel-to-serial converter to a signal complying with a differential serial transmission system and transferring the signal toward the second device via a transmission line, and each of the receivers comprises a reception section for receiving the data transferred from corresponding one of the transmitters via the transmission line, a second PLL circuit for generating a third clock equivalent in frequency to n times the first clock output and transmitted from the first PLL circuit and a fourth clock equivalent in frequency to the first clock in synchronism with the first clock, and a serial-to-parallel converter for conducting serial-to-parallel conversion on the received data based on the third clock output from the second PLL circuit.

40. The data reception device according to claim 39, wherein the data transfer system comprises a clock transmission device for transmitting the input clock as a common clock for the receivers, and a first latch circuit for latching signals output from the receivers based on the common clock transmitted by the clock transmission device.

41. The data reception device according to claim 40, wherein the data transfer system comprises a gate signal transmission device for transmitting a gate signal latched based on the input clock toward the second device, and a gate circuit for gating a signal latched by the first latch circuit based on the gate signal transmitted by the gate signal transmission device.

42. The data reception device according to claim 40, wherein a second latch circuit for latching the data based on the input clock is provided before the parallel-to-serial converter, and a third latch circuit for latching a signal output from the serial-to-parallel converter based on the fourth clock is provided between the serial-to-parallel converter and the first latch circuit.

43. The data reception device according to claim 39, wherein the data transfer system comprises a gate signal transmission device for transmitting a gate signal latched based on the input clock toward the second device, and a gate circuit for gating a signal output from the receivers based on the gate signal transmitted by the gate signal transmission device.

44. The data reception device according to claim 43, wherein the data transfer system comprises a clock transmission device for transmitting the input clock as a common clock for the receivers, and a latch circuit for latching a signal output from the gate circuit based on the common clock transmitted by the clock transmission device.

* * * * *

UNITED STATES PATENT AND TRADEMARK OFFICE
CERTIFICATE OF CORRECTION

| | | |
|---|---|---|
| PATENT NO. | : 7,109,980 B2 | Page 1 of 1 |
| APPLICATION NO. | : 10/602033 | |
| DATED | : September 19, 2006 | |
| INVENTOR(S) | : Tetsuya Shigeta et al. | |

It is certified that error appears in the above-identified patent and that said Letters Patent is hereby corrected as shown below:

On the title page:
In Item (73) "Assignees", add --Pioneer Display Products Corportion--.

Signed and Sealed this

Seventeenth Day of July, 2007

JON W. DUDAS
*Director of the United States Patent and Trademark Office*